US008393170B2

(12) United States Patent
Taguchi

(10) Patent No.: US 8,393,170 B2
(45) Date of Patent: Mar. 12, 2013

(54) CAPACITY CONTROL SYSTEM FOR VARIABLE CAPACITY COMPRESSOR AND DISPLAY DEVICE FOR THE SYSTEM

(75) Inventor: Yukihiko Taguchi, Maebashi (JP)

(73) Assignee: Sanden Corporation, Gunma (JP)

( * ) Notice: Subject to any disclaimer, the term of this patent is extended or adjusted under 35 U.S.C. 154(b) by 590 days.

(21) Appl. No.: 12/673,934

(22) PCT Filed: Aug. 12, 2008

(86) PCT No.: PCT/JP2008/064481

§ 371 (c)(1),
(2), (4) Date: Feb. 17, 2010

(87) PCT Pub. No.: WO2009/025208

PCT Pub. Date: Feb. 26, 2009

(65) Prior Publication Data

US 2011/0219797 A1 Sep. 15, 2011

(30) Foreign Application Priority Data

Aug. 17, 2007 (JP) ................................ 2007-212792

(51) Int. Cl.
*F25B 1/00* (2006.01)
*F25B 49/00* (2006.01)

(52) U.S. Cl. ...................................... 62/228.3; 62/228.5

(58) Field of Classification Search .................... 62/217, 62/222, 228.1, 228.3, 228.4, 228.5
See application file for complete search history.

(56) References Cited

U.S. PATENT DOCUMENTS 6,588,222 B1 * 7/2003 Urbank et al. .................. 62/127
6,622,500 B1 * 9/2003 Archibald et al. .............. 62/173

FOREIGN PATENT DOCUMENTS

| | | |
|---|---|---|
| CN | 1407288 | 4/2003 |
| JP | 03-071182 | 7/1991 |
| JP | 06-221301 | 8/1994 |
| JP | 10-038717 | 2/1998 |
| JP | 2005-067250 | 3/2005 |

* cited by examiner

*Primary Examiner* — Marc Norman
(74) *Attorney, Agent, or Firm* — Cozen O'Connor

(57) ABSTRACT

A capacity control system for a variable capacity compressor includes target suction pressure setting means for setting, based on external information input from external information detection means, a target suction pressure for controlling the pressure in a suction pressure region as a control target, suction pressure estimation means for estimating, based on the external information, a pressure that is estimated to prevail in the suction pressure region if the variable capacity compressor is operated with a maximum discharge capacity, and discharge capacity determination means for determining, based on the suction pressure estimated by the suction pressure estimation means and the target suction pressure set by the target suction pressure setting means, whether the variable capacity compressor is operating with the maximum discharge capacity or with a controlled discharge capacity.

21 Claims, 14 Drawing Sheets

CAPACITY CONTROL SYSTEM FOR VARIABLE CAPACITY COMPRESSOR AND DISPLAY DEVICE FOR THE SYSTEM

RELATED APPLICATIONS

This is a U.S. National Phase Application under 35 USC §371 of International Application PCT/JP2008/064481 filed on Aug. 17, 2007.

This application claims the priority of Japanese Patent Application No. 2007-212792 filed Aug. 17, 2007, the entire content of which is hereby incorporated by reference.

TECHNICAL FIELD

The present invention relates to a capacity control system for a variable capacity compressor used in an air conditioning system and a display device for use with the capacity control system.

BACKGROUND ART

A reciprocating-type variable capacity compressor used in an automotive air conditioning system, for example, includes a housing having a discharge chamber, a suction chamber, a crank chamber and cylinder bores defined therein. A drive shaft extending through the crank chamber is coupled with a swash plate such that the swash plate is tiltable relative to the drive shaft. A conversion mechanism including the swash plate converts rotation of the drive shaft to reciprocating motion of pistons received in the respective cylinder bores. The reciprocating motion of each piston causes a series of processes to take place, the processes including a suction process in which a working fluid is sucked from the suction chamber into the corresponding cylinder bore, a compression process in which the sucked working fluid is compressed, and a discharge process in which the compressed working fluid is discharged to the discharge chamber.

The stroke length of the individual pistons, that is, the discharge capacity of the compressor, can be varied by changing the pressure (control pressure) in the crank chamber. In order to control the discharge capacity, a capacity control valve is inserted in an admission passage communicating the discharge chamber with the crank chamber, and a constriction is formed in a bleeding passage communicating the crank chamber with the suction chamber.

As methods for controlling the discharge capacity, a suction pressure control scheme has been known. In some systems configured to execute the suction pressure control, the capacity control valve has a pressure sensitive member built therein for sensing the pressure (suction pressure) in the suction chamber. In the variable capacity compressor using such a capacity control valve, mechanical feedback control (suction pressure control) is carried out by means of the pressure sensitive member such that the suction pressure approaches a set suction pressure.

More specifically, the pressure sensitive member is constituted, for example, by a bellows or a diaphragm. Where a bellows is used as the pressure sensitive member, a compression spring is disposed within the bellows whose internal pressure is kept at a vacuum or atmospheric pressure, and one end of the bellows is acted upon by the suction pressure from outside. Thus, as the suction pressure decreases, the bellows serving as the pressure sensitive member extends.

The valve element of the capacity control valve is so arranged as to be applied with an electromagnetic force exerted by a solenoid as well as with a pressing force that the bellows as the pressure sensitive member produces when extending. While the amount of current supplied to the solenoid is fixed, the opening of the capacity control valve varies such that the suction pressure is kept at a set suction pressure determined by the amount of current supplied.

Meanwhile, Document 1 (Japanese Laid-open Patent Publication No. 10-38717) discloses a method of detecting the torque of a variable capacity compressor during the suction pressure control. In Document 1, the torque of the variable capacity compressor is calculated from the amount of current supplied to the solenoid of the capacity control valve and the outside air temperature. The calculated torque of the variable capacity compressor is used for controlling the rotational speed of the automotive engine.

In the suction pressure control, the amount of current (capacity control signal) to be supplied to the solenoid of the capacity control valve is determined on the basis of the set suction pressure. Where an actual suction pressure is higher than the set suction pressure by a certain amount, however, the discharge capacity of the variable capacity compressor can possibly rise to a maximum value if the determined amount of current is supplied to the solenoid.

The maximum value is determined by a mechanical constraint, namely, the tilt limit of the swash plate of the conversion mechanism. When the discharge capacity is at the maximum value, the discharge capacity naturally cannot be increased further even if the amount of current supplied to the solenoid is adjusted. In conventional systems, however, the solenoid is supplied with an amount of current exceeding the current supply amount (maximum-capacity current supply amount) with which the discharge capacity is maximized. This situation occurs because the amount of current supplied to the solenoid is determined taking account of the set suction pressure alone, and not the mechanical constraint on the maximum value of the discharge capacity.

While the solenoid is supplied with an amount of current exceeding the maximum-capacity current supply amount, there is no correlation between the amount of current supplied to the solenoid and the torque of the variable capacity compressor. If the correlation is lost, the torque of the variable capacity compressor cannot be accurately calculated by the torque detection method disclosed in Document 1.

As a result, instability of the engine speed control or engine stall may possibly be caused during the idling of the vehicle, for example.

In addition, if the torque of the variable capacity compressor cannot be accurately calculated, it is difficult to attain the original purpose of applying the variable capacity compressor to an air conditioning system, namely, to reduce the motive power consumed by the air conditioning system or the vehicle and thereby save energy as countermeasures against global warming.

DISCLOSURE OF THE INVENTION

A first object of the present invention is to provide a capacity control system for a variable capacity compressor, which system is capable of determining the operating state of the variable capacity compressor, for example, whether the compressor is operating with a maximum discharge capacity or with a controlled discharge capacity.

A second object of the present invention is to provide a capacity control system for a variable capacity compressor, which system is capable of accurately calculating drive load of the variable capacity compressor at all times including a situation where the variable capacity compressor is operating with a maximum discharge capacity.

A third object of the present invention is to provide a capacity control system for a variable capacity compressor, which system is simplified in construction and yet capable of suction pressure control.

A fourth object of the present invention is to provide a display device that allows the user using an air conditioning system to visually recognize a calculated drive load, thereby raising the user's environmental awareness.

To achieve the above objects, the invention according to claim 1 provides a capacity control system for a variable capacity compressor whose capacity varies with change in control pressure, the variable capacity compressor being inserted, together with a heat radiator, an expansion device and an evaporator, in a circulation path for circulating a refrigerant, to constitute a refrigeration cycle of an air conditioning system, a pressure of the refrigerant at any portion in a discharge pressure region of the refrigeration cycle being used as a discharge pressure, a pressure of the refrigerant at any portion in a suction pressure region of the refrigeration cycle being used as a suction pressure, the capacity control system comprising: a capacity control valve capable of adjusting the capacity of the variable capacity compressor by varying the control pressure; external information detection means for detecting one or more items of external information related to the refrigeration cycle; and target suction pressure setting means for setting, based on the external information detected by the external information detection means, a target suction pressure for controlling the pressure in the suction pressure region as a control target, wherein the control pressure is varied to adjust the refrigerant discharge capacity of the variable capacity compressor such that the pressure in the suction pressure region becomes equal to the target suction pressure, the capacity control system being characterized by further comprising: suction pressure estimation means for estimating, based on the external information detected by the external information detection means, a pressure that is estimated to prevail in the suction pressure region if the variable capacity compressor is operated with a maximum discharge capacity; and discharge capacity determination means for determining, based on the estimated pressure of the suction pressure region estimated by the suction pressure estimation means and the target suction pressure set by the target suction pressure setting means, whether the variable capacity compressor is operating with the maximum discharge capacity or with a controlled discharge capacity.

The capacity control system according to claim 2 is characterized in that: the discharge capacity determination means compares the estimated pressure of the suction pressure region estimated by the suction pressure estimation means with the target suction pressure set by the target suction pressure setting means, if the estimated pressure of the suction pressure region estimated by the suction pressure estimation means is higher than the target suction pressure set by the target suction pressure setting means, the discharge capacity determination means judges that the variable capacity compressor is operating with the maximum discharge capacity, and if the estimated pressure of the suction pressure region estimated by the suction pressure estimation means is lower than the target suction pressure set by the target suction pressure setting means, the discharge capacity determination means judges that the variable capacity compressor is operating with the controlled discharge capacity.

The capacity control system according to claim 3 is characterized in that: the target suction pressure setting means sets a threshold with reference to the target suction pressure, the discharge capacity determination means compares the estimated pressure of the suction pressure region estimated by the suction pressure estimation means with the threshold set by the target suction pressure setting means, if the estimated pressure of the suction pressure region estimated by the suction pressure estimation means is higher than the threshold set by the target suction pressure setting means, the discharge capacity determination means judges that the variable capacity compressor is operating with the maximum discharge capacity, and if the estimated pressure of the suction pressure region estimated by the suction pressure estimation means is lower than the threshold set by the target suction pressure setting means, the discharge capacity determination means judges that the variable capacity compressor is operating with the controlled discharge capacity.

The capacity control system according to claim 4 is characterized in that: the target suction pressure setting means sets upper- and lower-limit thresholds with reference to the target suction pressure, the discharge capacity determination means compares the estimated pressure of the suction pressure region estimated by the suction pressure estimation means with the thresholds set by the target suction pressure setting means, if the estimated pressure of the suction pressure region estimated by the suction pressure estimation means is higher than the upper-limit threshold set by the target suction pressure setting means, the discharge capacity determination means judges that the variable capacity compressor is operating with the maximum discharge capacity, and if the estimated pressure of the suction pressure region estimated by the suction pressure estimation means is lower than the lower-limit threshold set by the target suction pressure setting means, the discharge capacity determination means judges that the variable capacity compressor is operating with the controlled discharge capacity.

The capacity control system according to claim 5 is characterized in that: when the estimated pressure of the suction pressure region estimated by the suction pressure estimation means assumes a value between the upper- and lower-limit thresholds, the discharge capacity determination means judges that the variable capacity compressor is operating with the maximum discharge capacity if the estimated pressure of the suction pressure region is greater than or equal to a criterion value set between the upper- and lower-limit thresholds, and judges that the variable capacity compressor is operating with the controlled discharge capacity if the estimated pressure of the suction pressure region is smaller than the criterion value.

The capacity control system according to claim 6 is characterized in that: the criterion value is variable in accordance with the external information detected by vehicle speed detection means as the external information detection means for detecting a vehicle speed, and/or the external information detected by rotational speed detection means as the external information detection means for detecting a physical quantity corresponding to a rotational speed of the variable capacity compressor.

The capacity control system according to claim 7 is characterized in that: the criterion value is variable in accordance with the external information detected by heat load detection means as the external information detection means.

The capacity control system according to claim 8 is characterized in that: the suction pressure estimation means estimates the pressure in the suction pressure region, based on the external information obtained by discharge pressure calculation means as the external information detection means for calculating the pressure of the discharge pressure region of the variable capacity compressor, the external information detected by the heat load detection means, and the external information detected by the rotational speed detection means.

The capacity control system according to claim 9 is characterized in that: the discharge pressure calculation means calculates the pressure of the discharge pressure region, based on the external information detected by pressure detection means for detecting a pressure in a high pressure region ranging from the discharge pressure region of the variable capacity compressor to the expansion device of the refrigeration cycle.

The capacity control system according to claim 10 is characterized in that: the expansion device comprises a thermostatic automatic expansion valve, the capacity control system further comprises degree-of-superheating calculation means for calculating, based on the external information detected by the pressure detection means, a degree of superheating in an outlet region of the evaporator, and the suction pressure estimation means estimates the pressure of the suction pressure region, based on the external information calculated by the degree-of-superheating calculation means.

The capacity control system according to claim 11 is characterized in that: the external information detection means includes degree-of-superheating detection means for detecting a degree of superheating in a region ranging from an outlet region of the evaporator to the suction pressure region of the variable capacity compressor, and the suction pressure estimation means estimates the pressure of the suction pressure region, based on the external information detected by the degree-of-superheating detection means.

The capacity control system according to claim 12 is characterized in that: a pressure difference between the threshold or the upper- or lower-limit threshold set by the target suction pressure setting means and the target suction pressure with reference to which the threshold or the upper- or lower-limit threshold is set is variable in accordance with the target suction pressure.

The capacity control system according to claim 13 is characterized by further comprising drive load calculation means for calculating a drive load of the variable capacity compressor, wherein the drive load calculation means calculates the drive load of the variable capacity compressor according to a first drive load computing equation if it is judged by the discharge capacity determination means that the variable capacity compressor is operating with the maximum discharge capacity, and calculates the drive load of the variable capacity compressor according to a second drive load computing equation if it is judged by the discharge capacity determination means that the variable capacity compressor is operating with the controlled discharge capacity.

The capacity control system according to claim 14 is characterized in that: the first drive load computing equation according to which the drive load is calculated by the drive load calculation means includes, as variables, the pressure of the discharge pressure region calculated by the discharge pressure calculation means and the estimated pressure of the suction pressure region estimated by the suction pressure estimation means.

The capacity control system according to claim 15 is characterized in that: the second drive load computing equation according to which the drive load is calculated by the drive load calculation means includes, as variables, the pressure of the discharge pressure region calculated by the discharge pressure calculation means and the target suction pressure set by the target suction pressure setting means.

The capacity control system according to claim 16 is characterized in that: the second drive load computing equation according to which the drive load is calculated by the drive load calculation means includes, as a variable, a pressure difference between the pressure of the discharge pressure region calculated by the discharge pressure calculation means and the target suction pressure set by the target suction pressure setting means.

The invention according to claim 17 provides a capacity control system for a variable capacity compressor whose capacity varies with change in control pressure, the variable capacity compressor being inserted, together with a heat radiator, an expansion device and an evaporator, in a circulation path for circulating a refrigerant, to constitute a refrigeration cycle of an air conditioning system, the capacity control system comprising: a capacity control valve having a valve element applied with a discharge pressure, which is a pressure of the refrigerant at any portion in a discharge pressure region of the refrigeration cycle, with a suction pressure, which is a pressure of the refrigerant at any portion in a suction pressure region of the refrigeration cycle, and with an electromagnetic force of a solenoid in such a manner that the discharge pressure is countered by the suction pressure and the electromagnetic force, the valve element being capable of opening and closing a valve hole to vary the control pressure and thereby adjust the capacity of the variable capacity compressor; external information detection means for detecting one or more items of external information related to the refrigeration cycle; and target suction pressure setting means for setting, based on the external information detected by the external information detection means, a target suction pressure for controlling the pressure in the suction pressure region as a control target, wherein an opening of the capacity control valve is varied in accordance with the external information detected by the external information detection means, to vary the control pressure and thereby adjust the refrigerant discharge capacity of the variable capacity compressor, the capacity control system being characterized by further comprising: discharge pressure calculation means for calculating, based on the external information detected by the external information detection means, the pressure in the discharge pressure region of the variable capacity compressor; control signal calculation means for calculating a discharge capacity control signal based on the pressure of the discharge pressure region calculated by the discharge pressure calculation means and the target suction pressure set by the target suction pressure setting means; solenoid driving means for supplying an electric current to the solenoid of the capacity control valve in accordance with the discharge capacity control signal calculated by the control signal calculation means; discharge capacity determination means for determining the discharge capacity of the variable capacity compressor; and drive load calculation means for calculating a drive load of the variable capacity compressor.

The capacity control system according to claim 18 is characterized in that: the drive load calculation means calculates the drive load of the variable capacity compressor according to a first drive load computing equation if it is judged by the discharge capacity determination means that the variable capacity compressor is operating with a maximum discharge capacity, and calculates the drive load of the variable capacity compressor according to a second drive load computing equation if it is judged by the discharge capacity determination means that the variable capacity compressor is operating with a controlled discharge capacity.

The capacity control system according to claim 19 is characterized in that: the drive load calculation means outputs the calculated drive load of the variable capacity compressor to an engine control device of the vehicle.

The capacity control system according to claim 20 is characterized in that: the variable capacity compressor includes a housing having a discharge chamber, a crank chamber, a suction chamber and cylinder bores defined therein; pistons received in the respective cylinder bores; a drive shaft rotatably supported in the housing; a conversion mechanism including a tiltable swash plate element for converting rotation of the drive shaft to reciprocating motion of the pistons; an admission passage communicating the discharge chamber with the crank chamber; and a bleeding passage communicating the crank chamber with the suction chamber, wherein the capacity control valve is inserted in one of the admission passage and the bleeding passage.

The invention according to claim 21 provides a display device for use with the capacity control system, characterized in that: the display device displays visual information indicative of energy saving operation mode in a recognizable manner when it is judged by the discharge capacity determination means that the variable capacity compressor is operating with the controlled discharge capacity.

The invention according to claim 22 provides a display device for use with a capacity control system for a variable capacity compressor whose capacity varies with change in control pressure, the variable capacity compressor being inserted, together with a heat radiator, an expansion device and an evaporator, in a circulation path for circulating a refrigerant, to constitute a refrigeration cycle of an air conditioning system, wherein the capacity control system includes a capacity control valve capable of adjusting the capacity of the variable capacity compressor by varying the control pressure; external information detection means for detecting one or more items of external information related to the refrigeration cycle; target suction pressure setting means for setting, based on the external information detected by the external information detection means, a target suction pressure for controlling pressure in a suction pressure region as a control target; and drive load calculation means for calculating a drive load of the variable capacity compressor, the display device being characterized in that a drive load signal output from the drive load calculation means is displayed as visually recognizable information by the display device.

The display device according to claim 23 is characterized in that: the capacity control system for the variable capacity compressor further includes discharge capacity determination means for determining the discharge capacity of the variable capacity compressor.

The display device according to claim 24 is characterized in that: the discharge capacity determination means determines whether the variable capacity compressor is operating with a maximum discharge capacity or with a controlled discharge capacity.

The display device according to claim 25 is characterized in that: the display device displays visual information indicative of energy saving operation mode in a recognizable manner when it is judged by the discharge capacity determination means that the variable capacity compressor is operating with the controlled discharge capacity.

With the capacity control system according to claims 1 and 2, it is possible to determine whether the variable capacity compressor is operating with the maximum discharge capacity or with the controlled discharged capacity. The information on the discharge capacity can be used for the control of stabilizing the rotational speed of the engine of the vehicle and also can be used to promote energy saving as countermeasures against global warming.

In the capacity control system of claim 3, the target suction pressure setting means sets the threshold with reference to the target suction pressure. This makes it possible to set a range within which the operating state of the variable capacity compressor can be reliably determined.

In the capacity control system of claim 4, the target suction pressure setting means sets upper- and lower-limit thresholds with reference to the target suction pressure. It is therefore possible to set regions by means of which a reliable determination can be made as to whether the variable capacity compressor is operating with the maximum discharge capacity or with the controlled discharge capacity.

With the capacity control system according to claims 5 to 7, the determination accuracy can be improved even in a region in which it is difficult to make a reliable determination as to whether the variable capacity compressor is operating with the maximum discharge capacity or the controlled discharge capacity.

With the capacity control system according to claims 8 to 12, it is possible to determine with higher reliability whether the variable capacity compressor is operating with the maximum discharge capacity or with the controlled discharge capacity.

With the capacity control system according to claims 13 to 16, the drive load of the variable capacity compressor whose suction pressure is controlled can be calculated with high accuracy.

With the capacity control system according to claims 17 and 18, the suction pressure control can be executed by means of simplified construction. In addition, the drive load of the variable capacity compressor can be calculated with high accuracy.

In the capacity control system of claim 19, the drive load signal calculated with improved accuracy is input to the engine control device of the vehicle. With the capacity control system, therefore, the engine control can be effectively stabilized.

In the capacity control system of claim 20, the variable capacity compressor is of a reciprocating type. In the reciprocating-type variable capacity compressor, the minimum stroke of the pistons determined by the minimum tilt angle of the swash plate element can be set to a very small value, permitting the minimum discharge capacity of the variable capacity compressor to be set to a very small value. It is therefore possible to widen the range over which the discharge capacity of the variable capacity compressor is mechanically varied. In the capacity control system, therefore, the widened suction pressure control range can be effectively utilized by setting the target suction pressure.

With the display device according to claims 21 to 25, it is possible to promote saving of the energy consumed by the variable capacity compressor while the air conditioning system is used. It is also possible to raise the environmental awareness of the user using the air conditioning system.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

EXPLANATION OF REFERENCE SIGNS

<Explanation of Reference Signs>

| | |
|---|---|
| 100: | variable capacity compressor |
| 101: | housing |
| 101a: | cylinder bore |
| 105: | crank chamber |
| 106: | drive shaft |
| 130: | piston |
| 140: | suction chamber |
| 142: | discharge chamber |
| 200, 300: | capacity control valve |
| 202, 301a: | valve hole |
| 204, 304: | valve element |
| 215, 315: | solenoid unit (solenoid) |
| 350, 400: | control device |
| 351, 420: | target suction pressure setting means |
| 352: | control signal calculation means |
| 401: | target evaporator temperature setting means (external information detection means) |
| 402: | temperature sensor (evaporator temperature detection means; external information detection means) |
| 403: | pressure sensor (discharge pressure detection means; external information detection means) |
| 404: | outside air temperature sensor (external information detection means) |
| 405: | vehicle interior temperature sensor (external information detection means) |
| 406: | evaporator fan voltage detection means (external information detection means) |

-continued

<Explanation of Reference Signs>

| | |
|---|---|
| 408: | engine rotation speed sensor (compressor rotation speed detection means; external information detection means) |
| 410: | control current calculation means |
| 411: | solenoid driving means |
| 421: | discharge pressure calculation means |
| 422: | degree-of-superheating calculation means |
| 423: | suction pressure estimation means |
| 424: | discharge capacity determination means |
| 425: | drive load calculation means |
| 460: | display device |

BEST MODE OF CARRYING OUT THE INVENTION

Capacity control systems for a variable capacity compressor according to the present invention will be described below with reference to the drawings.

FIGS. 1 through 8 illustrate a capacity control system for a variable capacity compressor according to one embodiment of the present invention. In this embodiment, the capacity control system A of the invention is applied to a refrigeration cycle of an automotive air conditioning system.

Figure 1:
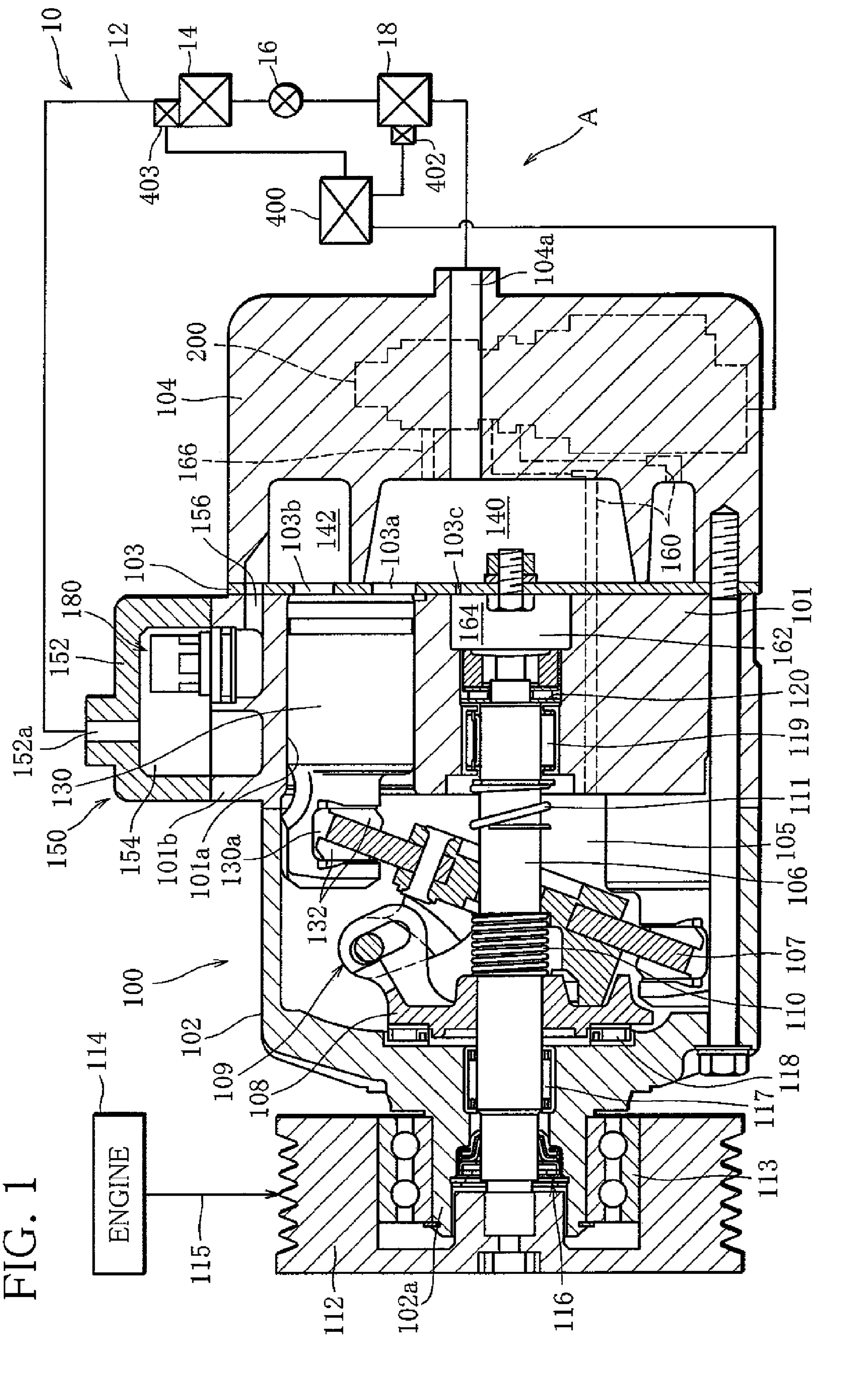
FIG. 1 is a longitudinal sectional view of a variable capacity compressor and also illustrates a schematic construction of a refrigeration cycle of an automotive air conditioning system to which one embodiment of the present invention is applied.

As illustrated in FIG. 1, the refrigeration cycle 10 of the automotive air conditioning system comprises a circulation path 12 through which a refrigerant as a working fluid is circulated. A variable capacity compressor 100, a heat radiator (condenser) 14, an expansion device (thermostatic automatic expansion valve) 16 and an evaporator 18 are successively inserted in the circulation path 12 in the order mentioned as viewed in the flowing direction of the refrigerant. The variable capacity compressor 100 is operated to perform a series of processes including a process of sucking in the refrigerant, a process of compressing the sucked refrigerant and a process of discharging the compressed refrigerant, so that the refrigerant circulates through the circulation path 12.

The evaporator 18 also constitutes part of an air circuit of the automotive air conditioning system. Because of the heat of vaporization of the refrigerant in the evaporator 18, the air passing by the evaporator 18 is cooled.

The variable capacity compressor 100 is, for example, a swash plate-type clutchless compressor. The compressor 100 comprises a cylinder block 101 having a plurality of cylinder bores 101*a* formed therethrough. A front housing 102 is attached to one end of the cylinder block 101, and a rear housing (cylinder head) 104 is attached to the other end of the cylinder block 101 with a valve plate 103 interposed therebetween.

The cylinder block 101 and the front housing 102 cooperatively define a crank chamber 105 therein, and a drive shaft 106 extends through the crank chamber 105 in the longitudinal direction of the compressor. The drive shaft 106 penetrates through an annular swash plate 107 arranged in the crank chamber 105, and the swash plate 107 is hinged, through a coupler 109, to a rotor 108 fixed on the drive shaft 106. Accordingly, the swash plate 107 can be tilted relative to the drive shaft 106 while moving along same.

A coil spring 110 is disposed around a portion of the drive shaft 106 located between the rotor 108 and the swash plate 107, to press the swash plate 107 in a direction toward a minimum tilt angle. Another coil spring 111 is disposed on the other side of the swash plate 107, that is, around a portion of the drive shaft 106 located between the swash plate 107 and the cylinder block 101, to press the swash plate 107 in a direction toward a maximum tilt angle.

An end portion of the drive shaft 106 located close to the front housing 102 penetrates through a boss 102*a* protruding outward from the front housing 102, and a pulley 112 serving as a power transmission device is coupled to the outer end of the drive shaft 106. The pulley 112 is rotatably supported on the boss 102*a* with a ball bearing 113 therebetween, and a belt 115 is passed around the pulley 112 and an automotive engine 114 serving as an external drive source.

A shaft seal 116 is arranged inside the boss 102*a* and seals the interior of the front housing 102 off from the outside of same. The drive shaft 106 is rotatably supported in both radial and thrust directions by bearings 117, 118, 119 and 120. When motive power is transmitted from the engine 114 to the pulley 112, the drive shaft 106 can rotate together with the pulley 112.

Pistons 130 are received in the respective cylinder bores 101*a* and each have a tail protruding integrally therefrom into the crank chamber 105. A pair of shoes 132 are arranged in a recess 130*a* formed in the tail and are disposed into sliding contact with an outer peripheral portion of the swash plate 107 from opposite sides of same. Thus, each piston 130 and the swash plate 107 are interlocked with each other via the shoes 132 such that as the drive shaft 106 rotates, the piston 130 reciprocates in the corresponding cylinder bore 101*a*.

The rear housing 104 has a suction chamber 140 and a discharge chamber 142 defined therein. The suction chamber 140 can communicate with each cylinder bore 101*a* through a corresponding suction hole 103*a* formed through the valve plate 103, and the discharge chamber 142 can communicate with each cylinder bore 101*a* through a corresponding discharge hole 103*b* formed through the valve plate 103. The suction and discharge holes 103*a* and 103*b* are opened and closed by respective suction and discharge valves, not shown.

A muffler 150 is arranged on one side of the cylinder block 101 and has a muffler casing 152 joined via a seal member, not shown, to a muffler base 101*b* formed integrally with the cylinder block 101. The muffler casing 152 and the muffler base 101*b* cooperatively define a muffler space 154 therein, and the muffler space 154 communicates with the discharge chamber 142 via a discharge passage 156 extending through the rear housing 104, the valve plate 103 and the muffler base 101*b*.

A discharge port 152*a* is formed in the muffler casing 152, and a check valve 180 is arranged in the muffler space 154 in such a manner as to block the communication between the discharge passage 156 and the discharge port 152*a*.

Specifically, the check valve 180 opens and closes in accordance with the pressure difference between the pressure in the discharge passage 156 and the pressure in the muffler space 154. When the pressure difference is smaller than a predetermined value, the check valve 180 is closed, and when the pressure difference is larger than the predetermined value, the check valve 180 opens.

Accordingly, the discharge chamber 142 can be connected to an outgoing section of the circulation path 12 through the discharge passage 156, the muffler space 154 and the discharge port 152*a*, and the muffler space 154 is connected with and disconnected from the discharge chamber 142 by the check valve 180. The suction chamber 140, on the other hand, communicates with an incoming or, return section of the circulation path 12 through a suction port 104*a* formed through the rear housing 104.

A capacity control valve (electromagnetic control valve) 200 for the variable capacity compressor 100 is accommodated in the rear housing 104 and is inserted in an admission passage 160. The admission passage 160 extends from the rear housing 104 to the cylinder block 101 through the valve plate 103 so as to communicate the discharge chamber 142 with the crank chamber 105.

On the other hand, the suction chamber 140 communicates with the crank chamber 105 through a bleeding passage 162. The bleeding passage 162 includes gaps between the drive shaft 106 and the bearings 119 and 120, a space 164, and a fixed orifice 103*c* formed through the valve plate 103.

Also, the suction chamber 140 is connected to the capacity control valve 200, independently of the admission passage 160, through a pressure sensing passage 166 formed in the rear housing 104.

Figure 2:
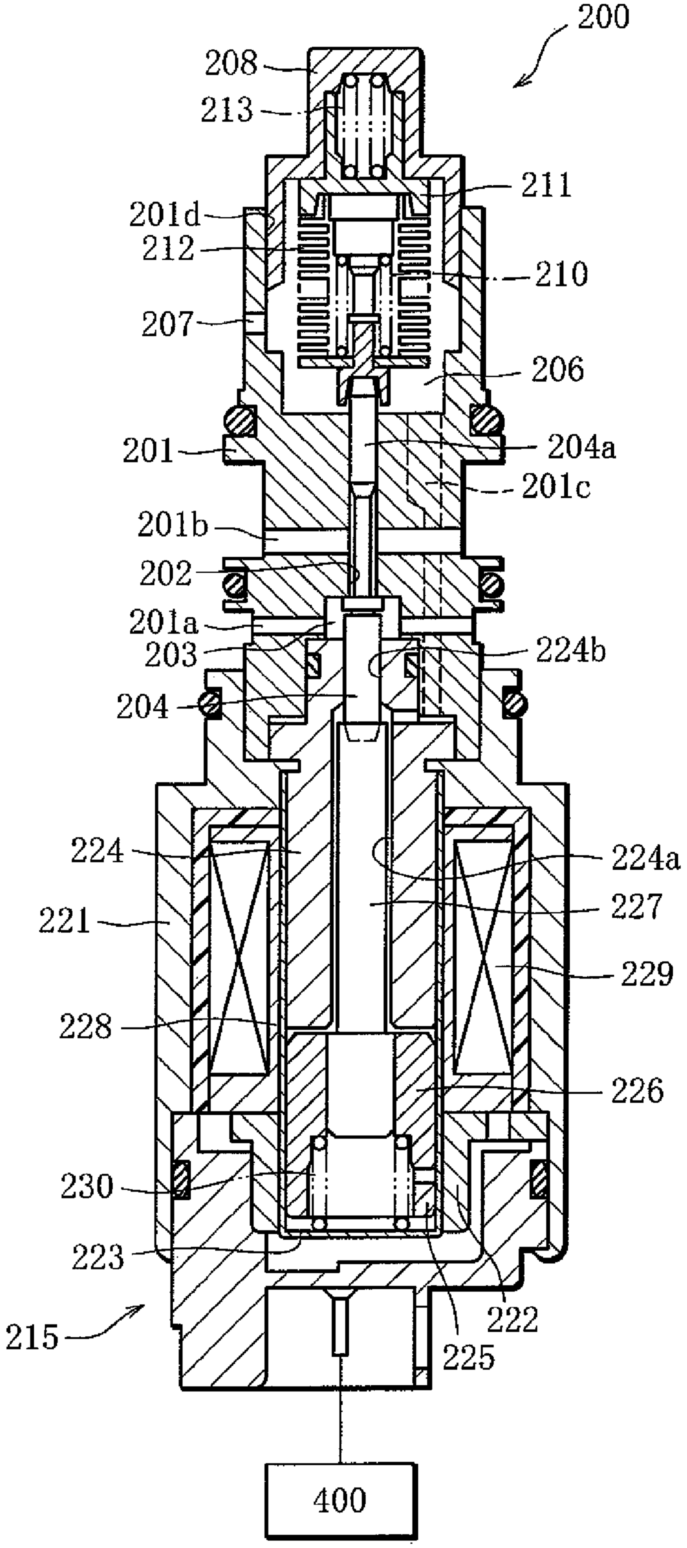
FIG. 2 is a sectional view illustrating connections of a capacity control valve in the variable capacity compressor shown in FIG. 1.

More specifically, as illustrated in FIG. 2, the capacity control valve 200 comprises a valve unit and a drive unit for opening and closing the valve unit. The valve unit includes a cylindrical valve housing 201, and a valve hole 202 is formed in a lower end portion, as viewed in the figure, of the valve housing 201. The valve hole 202 communicates with the crank chamber 105 through outlet ports 201*b* and a downstream section of the admission passage 160 and also opens into a valve chamber 203 formed in the lower end portion, as viewed in the figure, of the valve housing 201.

A columnar valve element 204 is accommodated in the valve chamber 203. The valve element 204 is movable within the valve chamber 203 in the axial direction of the valve housing 201 and, when brought into contact with an end face of the valve housing 201, closes the valve hole 202. Namely, the end face of the valve housing 201 serves as a valve seat.

Inlet ports 201*a* open in the outer peripheral surface of the valve housing 201 and communicate with the discharge chamber 142 through an upstream section of the admission passage 160. The inlet ports 201*a* also open into the valve chamber 203, and thus the discharge chamber 142 and the crank chamber 105 can communicate with each other through the valve chamber 203, the valve hole 202 and the outlet ports 201*b*.

A pressure sensing chamber 206 is arranged in an upper end portion, as viewed in the figure, of the valve housing 201 and communicates with the suction chamber 140 through a pressure sensing port 207 and the pressure sensing passage 166.

The valve element 204 has a pressure sensitive rod 204*a* formed integrally and coaxially therewith and projecting into the pressure sensing chamber 206. The pressure sensitive rod 204*a* is slidably supported by the valve housing 201.

The pressure sensing chamber 206 is defined by a recess 201*d* formed in the valve housing 201 and closed with a cap 208. A bellows 212 is accommodated in the pressure sensing chamber 206 and an interior thereof is kept at a vacuum. Also, a spring 210 is disposed within the bellows 212. The bellows 212 receives the pressure in the suction chamber 140 and functions as a pressure sensitive member.

The pressure sensitive rod 204 of the valve element 204 abuts against the lower end of the bellows 212, as viewed in the figure. The upper end portion of the bellows 212 is supported by a guide 211, which in turn is slidably supported by the cap 208. A forced release spring 213 is disposed between the cap 208 and the guide 211 to constantly press the bellows 212 in a valve opening direction. The distance over which the cap 208 is press-fitted into the recess 201*d* of the valve housing 201 is adjusted so that the capacity control valve 200 may perform a predetermined operation.

On the other hand, the drive unit comprises a solenoid unit 215 coupled to the lower end, as viewed in the figure, of the valve housing 201. The drive unit includes a cylindrical solenoid housing 221 attached to the valve housing 201 coaxially therewith, and an end cap 222 closing an open end of the solenoid housing 221 located opposite the valve housing 201.

A sleeve 223 is arranged in the solenoid housing 221 coaxially therewith. The sleeve 223 is a cylindrical member closed at one end and opening at the other end close to the valve housing 201. A fixed core 224 is partly accommodated in a portion of the sleeve 223 extending from the open end to an intermediate portion of same. A core accommodation space 225 is defined between the closed end of the sleeve 223 close to the end cap 222 and the fixed core 224, and a movable core 226 is axially movably arranged in the core accommodation space 225. A predetermined gap is provided between the fixed core 224 and the movable core 226.

A solenoid rod 227 is inserted through an insertion hole 224*a* formed in the fixed core 224 coaxially therewith. An end portion of the solenoid rod 227 located close to the valve chamber 203 is coupled to the valve element 204 integrally therewith. The other end portion of the solenoid rod 227 projects into the core accommodation space 225 and is securely fitted into a through hole formed through the movable core 226. Thus, the movable core 226 and the solenoid rod 227 move together with each other like a one-piece member. A spring 230 is disposed between the movable core 226 and the closed end of the sleeve 223 and constantly presses the movable core 226 and the solenoid rod 227 in a valve closing direction.

A coil 229 wound around a bobbin 228 is arranged inside the solenoid housing 221 so as to surround the sleeve 223. The bobbin 228 and the coil 229 are covered with a molded resin. The solenoid housing 221, the end cap 222, the fixed core 224 and the movable core 226 are each made of magnetic material and constitute a magnetic circuit. On the other hand, the sleeve 223 is made of nonmagnetic stainless steel or the like.

The core accommodation space 225 communicates with the pressure sensing chamber 206 of the valve housing 201 through a communication hole 201*c* formed in the valve housing 201. Namely, the core accommodation space 225 communicates with the suction chamber 140 through the pressure sensing chamber 206 and the communication hole 201*c*. Accordingly, the pressure in the crank chamber 105 acts upon the upper end face, as viewed in the figure, of the valve element 204 in the valve opening direction, while the suction pressure in the suction chamber 140 acts upon the lower end face of the valve element 204 in the valve closing direction.

Figure 3:
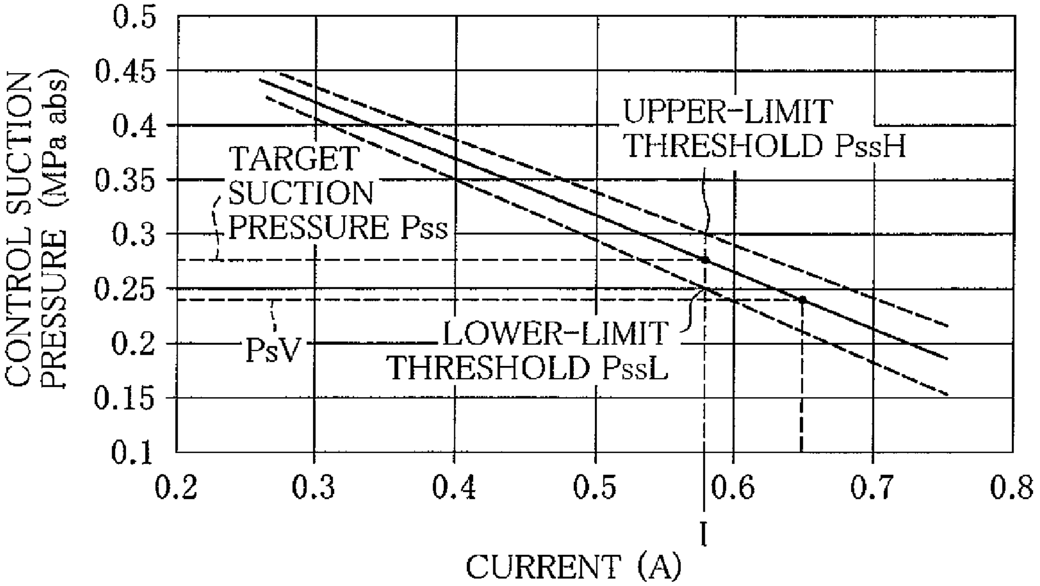
FIG. 3 is a graph illustrating the relationship between a control current supplied to the capacity control valve in FIG. 1 and a target suction pressure.

The capacity control valve 200 may be constructed such that the cross-sectional area of the valve hole 202 is equal to that of the valve element 204 supported by a supporting hole 224*b* formed in the fixed core 224. In this case, the discharge pressure in the valve chamber 203 communicating with the discharge chamber 142 acts upon the valve element 204 neither in the valve opening direction nor in the valve closing direction. Namely, the suction pressure control characteristic of the capacity control valve 200 is not influenced by the discharge pressure. Accordingly, the suction pressure as a control target can be unambiguously determined as a function of the amount of current supplied to the solenoid unit 215, as illustrated in FIG. 3.

The solenoid unit 215 is connected to a control device 400 provided externally to the variable capacity compressor 100 and, when supplied with a control current I from the control device 400, produces an electromagnetic force F(I). The electromagnetic force F(I) exerted by the solenoid unit 215 attracts the movable core 226 toward the fixed core 224 to urge the valve element 204 in the valve closing direction.

In the refrigeration cycle 10 of the automotive air conditioning system, while the engine is operated but the air conditioning system is not in operation, no electric current is supplied to the solenoid unit 215 of the capacity control valve 200 in the variable capacity compressor 100. In this case, the valve element 204 is forcedly moved away from the valve hole 202 by the elastic force of the spring 213, so that the capacity control valve 200 is opened. Accordingly, the discharge capacity of the variable capacity compressor 100 is kept at a minimum.

Since the check valve 180 is always applied with force in the valve closing direction, no refrigerant is supplied from the compressor 100 to the outgoing section of the circulation path 12. Consequently, the refrigerant discharged with the minimum capacity into the discharge chamber 142 flows into the crank chamber 105 through the admission passage 160 having the capacity control valve 200 inserted therein, and then returns from the crank chamber 105 to the suction chamber 140 through the bleeding passage 162. Namely, while the air conditioning system is not in operation, a small amount of the refrigerant is circulated within the compressor 100.

On the other hand, when the air conditioning system is put into operation, an electric current is supplied to the solenoid unit 215. Accordingly, the valve element 204 is moved to close the valve hole 202 against the elastic force of the spring 213, so that the capacity control valve 200 is closed. This means that the admission passage 160 is shut off. As a result, the pressure in the crank chamber 105 lowers and becomes equal to the suction pressure.

As the tilt angle of the swash plate 107 increases, the stroke of the pistons 130 increases, thus elevating the pressure in the discharge chamber 142. When the difference between the pressures acting upon the check valve 180 becomes larger than the predetermined value, the check valve 180 opens, allowing the compressed refrigerant to be supplied to the outgoing section of the circulation path 12.

During the operation of the variable capacity compressor 100, the control device 400 supplies the control current I to the solenoid unit 215 of the capacity control valve 200, to cause the solenoid unit 215 to produce the electromagnetic force F(I). The capacity control valve 200 is actuated in this manner to control the discharge capacity of the variable capacity compressor 100 such that a predetermined suction pressure, indicated in FIG. 3, is maintained.

Figure 4:
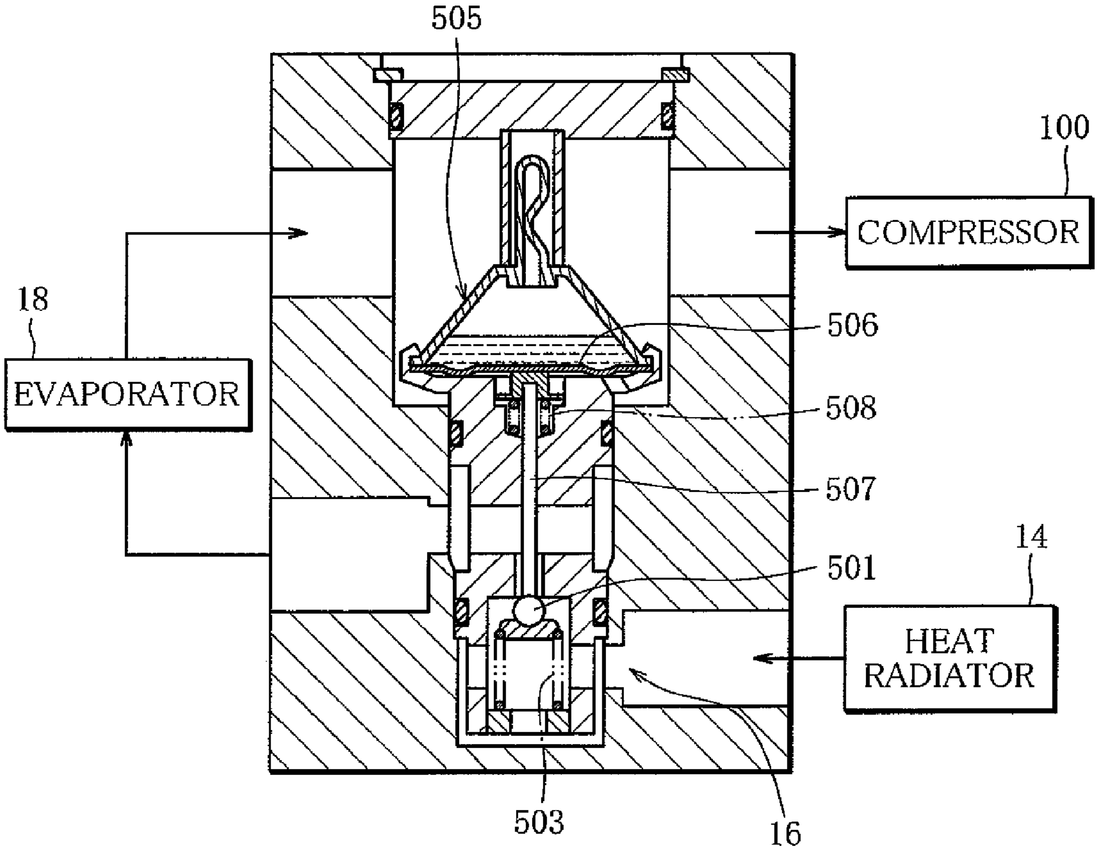
FIG. 4 is a sectional view of a thermostatic automatic expansion valve used in the refrigeration cycle including the variable capacity compressor of FIG. 1.

FIG. 4 illustrates the thermostatic automatic expansion valve 16 serving as an expansion device. The opening of the expansion valve 16 is subjected to mechanical feedback control such that the degree of superheating in the outlet region of the evaporator 18 becomes equal to a predetermined value. The expansion valve 16 has a superheating characteristic shown in FIG. 5, for example, as its control characteristic.

Figure 5:
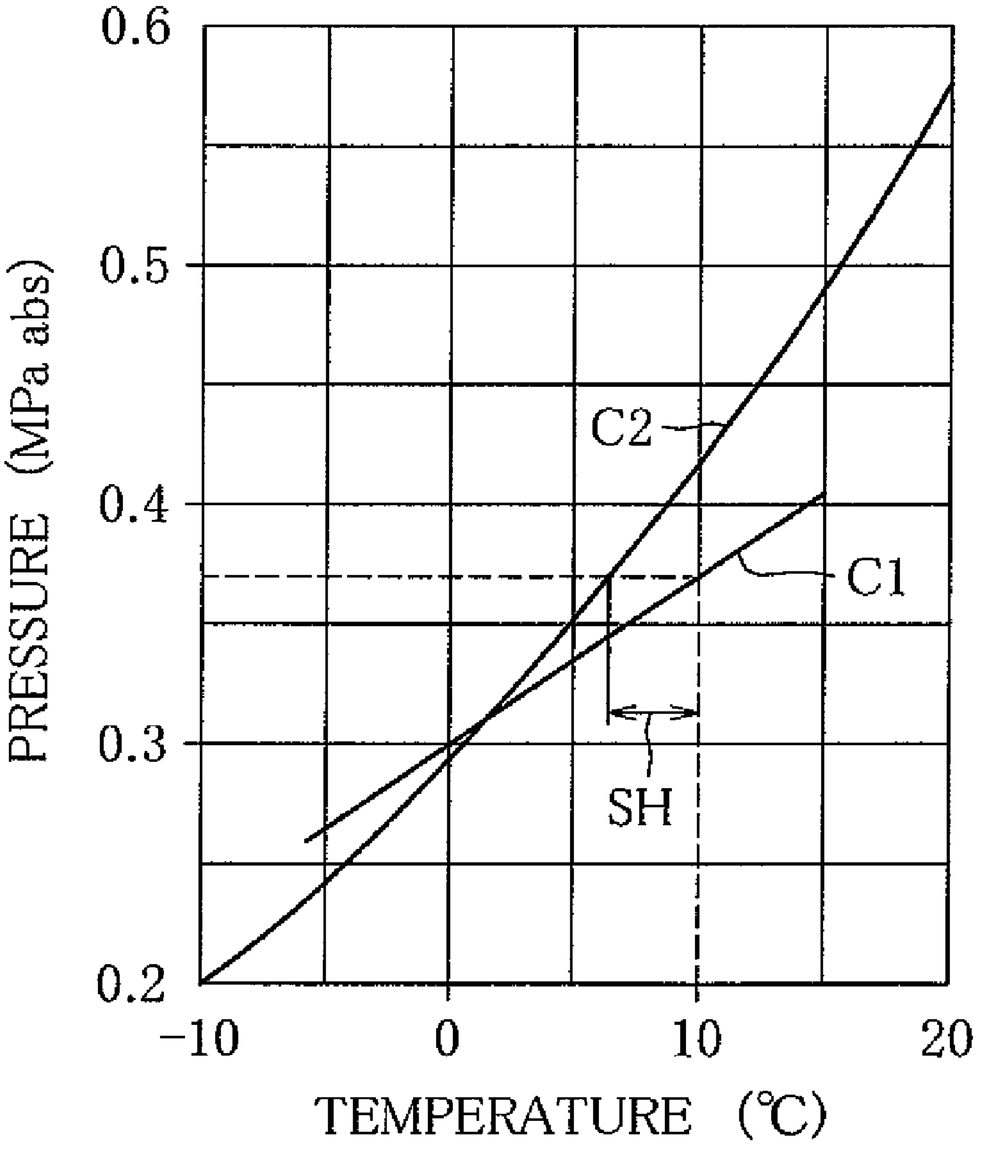
FIG. 5 is a graph illustrating superheating characteristics of the thermostatic automatic expansion valve shown in FIG. 4.

In FIG. 5, straight line C1 indicates the relationship (superheating characteristic) between the temperature and pressure Pe of the refrigerant at the outlet of the evaporator 18, which relationship is observed when the refrigerant pressure Pin at the inlet of the expansion valve 16 remains at a predetermined fixed value and which relationship is determined by the structure of the expansion valve 16. Curve C2 indicates the relationship between the saturation temperature and saturation pressure of the refrigerant (R134a). The expansion valve 16 is so constructed that the straight line C1 and the curve C2 may intersect with each other. In FIG. 5, a difference between the straight line C1 and the curve C2, taken along the horizontal axis, corresponds to the degree of superheating SH of the refrigerant at the outlet of the evaporator 18.

Figure 6:
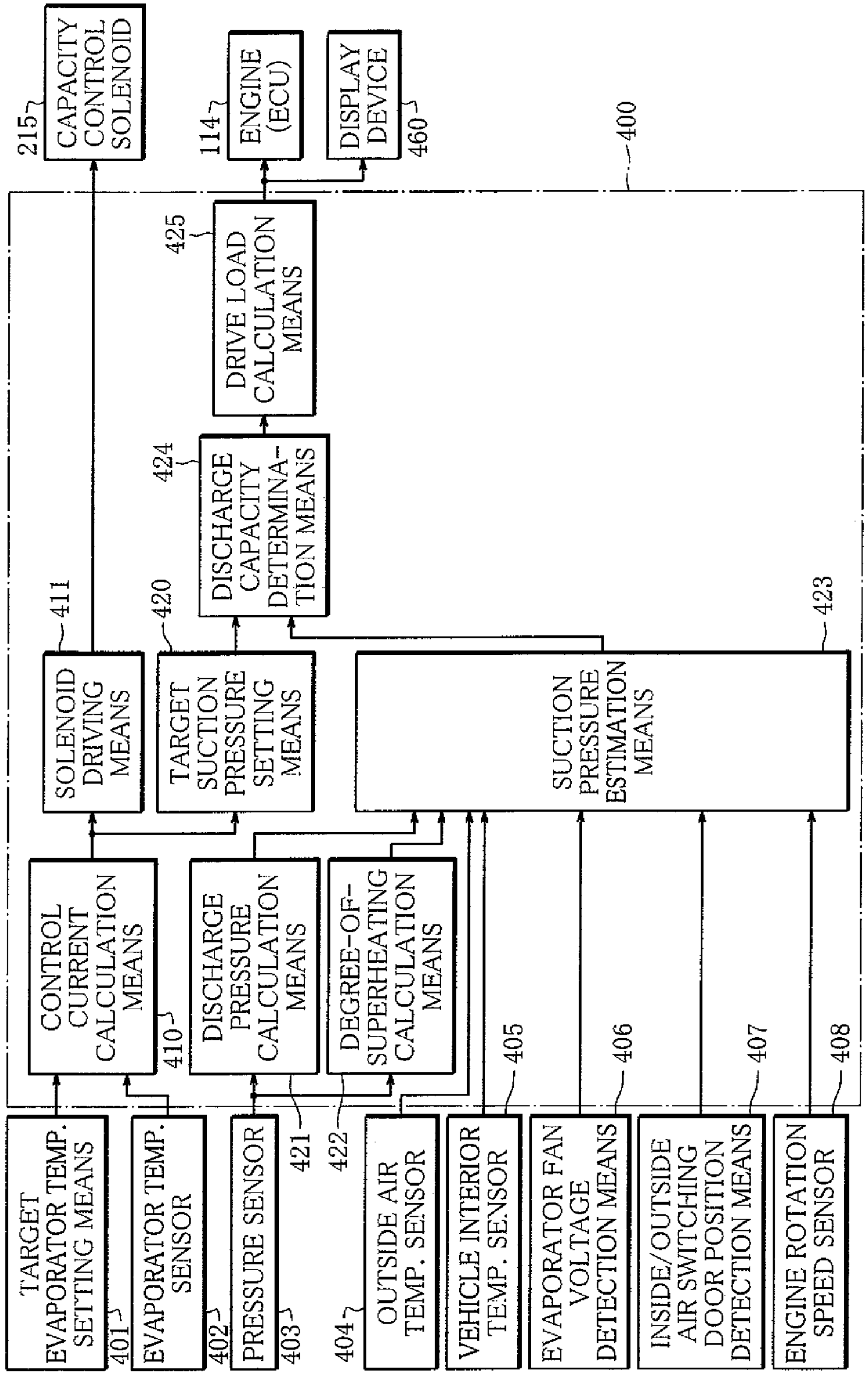
FIG. 6 is a block diagram illustrating a schematic configuration of a capacity control system according to the embodiment.

FIG. 6 is a block diagram illustrating a schematic configuration of the capacity control system A including the control device 400.

The capacity control system A has external information detection means for detecting one or more items of external information. Specifically, the external information detection means includes target evaporator temperature setting means 401 and a temperature sensor 402 serving as evaporator temperature detection means.

The target evaporator temperature setting means 401 sets a target evaporator outlet air temperature Tes on the basis of various external information including vehicle interior temperature setting, and provides the thus-set target evaporator outlet air temperature Tes to the control device 400 as an item of external information. The target evaporator outlet air temperature Tes is a target value for air temperature Te at the outlet of the evaporator 18 and is used as a target of discharge capacity control of the compressor 100. The target evaporator temperature setting means 401 may be implemented, for example, by part of an air conditioning ECU that controls the operation of the whole air conditioning system.

The temperature sensor 402 is attached to the outlet of the evaporator 18 forming part of the air circuit and detects the temperature Te of the air just left the evaporator 18 (see FIG. 1). The detected air temperature Te is input to the control device 400 as an item of external information.

The external information detection means also includes discharge pressure calculation means, and the discharge pressure calculation means includes a pressure sensor 403 as part thereof. The discharge pressure calculation means detects the discharge pressure Pd that acts upon the valve element 204. The pressure sensor 403 is attached to the inlet of the heat radiator 14 and detects the refrigerant pressure at the inlet of the radiator 14, the detected refrigerant pressure being input to the control device 400 (see FIG. 1).

Further, the external information detection means includes an outside air temperature sensor 404 and a vehicle interior temperature sensor 405. The outside air temperature sensor 404 is arranged at the vehicle's air intake section for introducing the outside air into the air circuit and detects the temperature Ta of the outside air. The vehicle interior temperature sensor 405 is arranged inside the vehicle compartment and detects the temperature Tt in the vehicle compartment.

Furthermore, the external information detection means includes evaporator fan voltage detection means 406 and inside/outside air switching door position detection means 407. The evaporator fan voltage detection means 406 detects a voltage Vf applied to a fan motor, as an index of the state of air flow produced by the evaporator fan. The inside/outside air switching door position detection means 407 detects the state As of ventilation passageway; namely, it determines whether the current mode is an outside air introduction mode or an inside air circulation mode.

In addition, the external information detection means includes compressor rotation speed detection means for detecting the rotational speed Nc of the compressor 100. The compressor rotation speed detection means includes an engine rotation speed sensor 408 for detecting the rotational speed of the engine 114. The rotational speed of the engine 114 detected by the engine rotation speed sensor 408 is multiplied by a predetermined pulley ratio, whereby the rotational speed Nc of the compressor 100 can be calculated.

The construction of the compressor rotation speed detection means is not particularly limited, and any suitable means may be used insofar as it is capable of detecting the rotational speed of the compressor 100 on the basis of a physical quantity related to the rotational speed of the compressor 100. The physical quantity related to the rotational speed of the compressor 100 includes the rotational speed of the compressor 100 itself.

A discharge pressure region of the refrigeration cycle 10 denotes a region from the discharge chamber 142 to the inlet of the heat radiator 14, and a suction pressure region of the refrigeration cycle 10 denotes a region from the outlet of the evaporator 18 to the suction chamber 140. The discharge pressure region also includes the cylinder bores 101*a* in the compressor process, and the suction pressure region also includes the cylinder bores 101*a* in the suction process.

The control device 400 is constituted, for example, by an independent ECU (Electronic Control Unit) but may be included in the air conditioning ECU or an engine ECU for controlling the operation of the engine 114. Also, the target evaporator temperature setting means 401 may be included in the control device 400.

The control device 400 comprises, as a discharge capacity control section, control current calculation means 410 and solenoid driving means 411.

The control current calculation means 410 obtains a deviation between the target evaporator outlet air temperature Tes set by the target evaporator temperature setting means 401 and the evaporator outlet air temperature Te actually detected by the evaporator temperature sensor 402, and calculates the control current I according to PI control (or PID control), for example, so that the deviation may be minimized.

In accordance with the amount of current calculated by the control current calculation means 410, the solenoid driving means 411 supplies the solenoid unit 215 with the control current I to drive the capacity control valve 200. The control current I is adjusted by varying the duty ratio through PWM (Pulse Width Modulation) using a predetermined drive frequency (e.g., 400 to 500 Hz). The solenoid driving means 411 detects the control current I flowing through the solenoid unit 215 and subjects the control current I to feedback control such that the detected control current I becomes equal to the amount of current calculated by the control current calculation means 410.

In this manner, the discharge capacity control section of the control device 400 controls the discharge capacity so that the actual evaporator outlet air temperature Te, detected by the evaporator temperature sensor 402, may approach the target evaporator outlet air temperature Tes set by the target evaporator temperature setting means 401.

The control device 400 further includes target suction pressure setting means 420, discharge pressure calculation means 421, degree-of-superheating calculation means 422, suction pressure estimation means 423, discharge capacity determination means 424, and drive load calculation means 425.

The target suction pressure setting means 420 sets thresholds (upper-limit threshold PssH and lower-limit threshold PssL) on the basis of the control current I calculated by the control current calculation means 410 and the characteristic illustrated in FIG. 3. The suction pressure control characteristic of the capacity control valve 200 is subject to variation due to the dimensional tolerance etc. of the individual parts caused during the manufacture. Taking account of such variation, the thresholds are set with reference to a target suction pressure Pss determined in accordance with the control current I. The range between the target suction pressure Pss and each of the upper- and lower-limit thresholds PssH and PssL, which are set with reference to the target suction pressure Pss, is varied in accordance with the control current I.

The discharge pressure calculation means 421 calculates the pressure Pd in the discharge pressure region of the variable capacity compressor 100, on the basis of the pressure Ph detected by the pressure sensor 403. The pressure sensor 403 is arranged at a location different from the discharge pressure region of the variable capacity compressor 100, and therefore, in an operating region where the heat load is high, a pressure difference may possibly be caused between the pressures Ph and Pd. Taking account of the pressure difference, the pressure Pd is calculated from the pressure Ph. Specifically, the pressure Pd in the discharge pressure region of the variable capacity compressor 100 can be calculated by means of a function f1(Ph) including, as a variable, the pressure Ph detected by the pressure sensor 403, and the function f1(Ph) may be derived beforehand.

Figure 7:
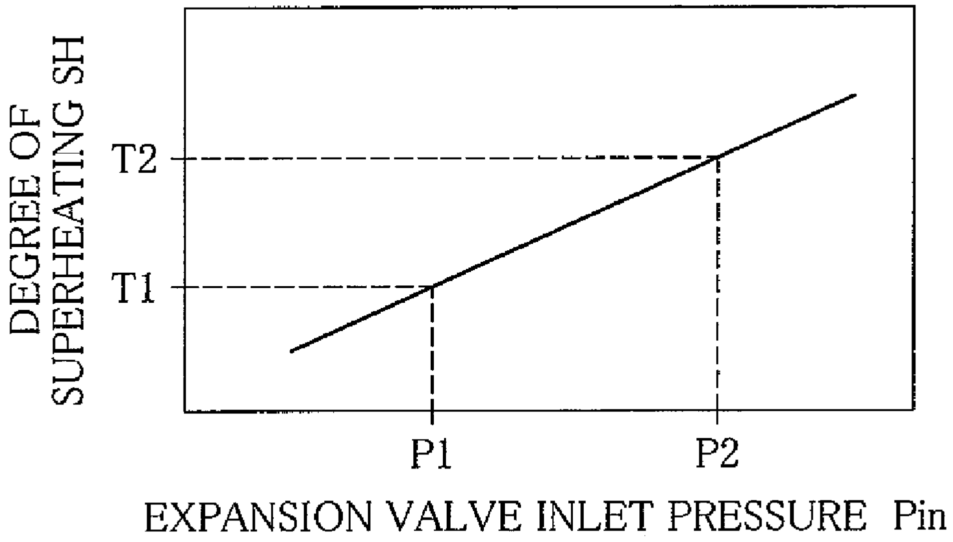
FIG. 7 is a graph illustrating a change in degree of superheating with respect to inlet pressure of the thermostatic automatic expansion valve of FIG. 4.

The degree-of-superheating calculation means 422 calculates the degree of superheating SH of the refrigerant in the outlet region of the evaporator 18. Specifically, the degree of superheating SH is calculated on the basis of the pressure Ph detected by the pressure sensor 403. The degree of superheating SH also can be calculated by means of a function f2(Ph) which includes, as a variable, the pressure Ph detected by the pressure sensor 403. This is because the operation of the thermostatic automatic expansion valve 16 shown in FIG. 4 fulfills the relationships indicated by expressions (1) to (3) below. Expression (2) indicates that a force Fb acting upon the valve element 501 of the thermostatic automatic expansion valve 16 in the valve closing direction varies with change in the inlet pressure Pin of the expansion valve 16, that is, the pressure Ph in the high pressure region. Expression (3) represents a condition for opening the expansion valve 16 and indicates that as the force Fb changes, the expansion valve 16 opens or closes, with the result that the degree of superheating SH varies as indicated in FIG. 7.

$$Fd=(Pn-Pe)\cdot Sd-(Pout-Pe)\cdot Sr-F1 \quad (1)$$

$$Fb=F2+(Pin-Pout)\cdot Sb \quad (2)$$

$$Fd>Fb \quad (3)$$

In the above expressions, Fd is the force acting upon the valve element 501 in the valve opening direction, Fb is the force acting upon the valve element 501 in the valve closing direction, Pn is the internal pressure of the temperature sensing section 505, Pe is the outlet pressure of the evaporator 18, Pin is the inlet pressure of the thermostatic automatic expansion valve 16, Pout is the outlet pressure of the thermostatic automatic expansion valve 16, F1 and F2 are the pressing forces exerted by the springs 508 and 503, respectively, Sd is the effective area of the diaphragm 506, Sb is the seal area of the valve element 501, and Sr is the cross-sectional area of the transmission rod 507.

The suction pressure estimation means 423 estimates the suction pressure Ps through calculation using a function f3(Pd, SH, Ta, Tt, Vf, As, Nc) which includes, as variables, the pressure Pd calculated by the discharge pressure calculation means 421, the degree of superheating SH calculated by the degree-of-superheating calculation means 422, the outside air temperature Ta detected by the outside air temperature sensor 404, the vehicle interior temperature Tt detected by the vehicle interior temperature sensor 405, the voltage Vf detected by the evaporator fan voltage detection means 406, the state As of the ventilation passageway detected by the inside/outside air switching door position detection means 407, and the compressor rotation speed Nc detected by the engine rotation speed sensor 408. Since Pd=f1(Ph) and SH=f2(Ph), the suction pressure Ps may be calculated by means of a function f4(Ph, Ta, Tt, Vf, As, Nc) including Pd, Ta, Tt, Vf, As and Nc as variables.

Instead of using the degree-of-superheating calculation means 422, degree-of-superheating detection means may be used which is arranged in the outlet region of the evaporator 18 to directly detect the degree of superheating SH of the refrigerant in the suction pressure region of the variable capacity compressor 100.

The following explains the concept underlying the estimation of the suction pressure Ps by the suction pressure estimation means 423.

While the variable capacity compressor 100 is operated with the maximum discharge capacity, the pressure Ps in the suction pressure region of the variable capacity compressor 100 can be estimated almost exactly if the pressure Pd in the discharge pressure region, the heat load Q of the evaporator 18, the degree of supercooling at the inlet of the expansion valve 16, the degree of superheating SH at the outlet of the evaporator 18, the rotational speed Nc of the variable capacity compressor 100 and the volumetric efficiency η of the variable capacity compressor 100 are found.

Where the detected state As of the ventilation passageway indicates the outside air introduction mode, the heat load Q of the evaporator 18 can be calculated by means of a function f4(Ta, Vf) including Ta and Vf as variables. On the other hand, where the detected state As of the ventilation passageway indicates the inside air circulation mode, the heat load Q can be calculated by means of a function f5(Tt, Vf) including Tt and Vf as variables.

In the refrigeration cycle 10 using the thermostatic automatic expansion valve 16, the degree of supercooling SC at the inlet of the expansion valve 16 does not change greatly. Accordingly, a suitable value may be set beforehand as the degree of supercooling SC and may be corrected by using other known variables Pd, Ta, Vf, As, etc., for example.

The volumetric efficiency η of the variable capacity compressor 100 can be calculated by means of a function f6(Pd, SH, Q, Nc) including other known variables, such as Pd, Q, Nc and SH. For the function f6, a map may be prepared in advance with respect to various operating conditions so that the function may be determined from the map.

In this manner, while the variable capacity compressor 100 is operated with the maximum discharge capacity, the pressure in the suction pressure region can be estimated almost exactly by using existing sensors. By using the humidity of the outside air and that of the vehicle interior, it is possible to improve the accuracy in estimating the heat load. Thus, an outside air humidity sensor and a vehicle interior humidity sensor may be employed as the heat load detection means.

In addition, in the outside air introduction mode, the heat load Q of the evaporator 18 may be calculated by means of a function f7(Ta, Vf, Vs) including Ta, Vf and Vs as variables. Vs represents the speed of the vehicle. The vehicle speed Vs is used because, when the vehicle speed Vs is higher than a predetermined value, the volume of air flowing by the evaporator 18 is influenced by the vehicle speed Vs.

The discharge capacity determination means 424 compares the upper-limit threshold PssH set by the target suction pressure setting means 420 with the pressure in the suction pressure region estimated by the suction pressure estimation means 423. If Ps>PssH is fulfilled, the discharge capacity determination means 424 judges that the variable capacity compressor 100 is operating with the maximum discharge capacity.

Also, the discharge capacity determination means 424 compares the lower-limit threshold PssL set by the target suction pressure setting means 420 with the pressure in the suction pressure region estimated by the suction pressure estimation means 423. If Ps<PssL is fulfilled, the discharge capacity determination means 424 judges that the variable capacity compressor 100 is operating with a controlled discharge capacity, in other words, with a discharge capacity smaller than the maximum discharge capacity.

If PssL≦Ps≦PssH is fulfilled, the discharge capacity determination means 424 compares a criterion value PsV with the target suction pressure Pss. The criterion value PsV is set to a suitable value between the upper- and lower-limit thresholds PssH and PssL. If Pss≧PsV is fulfilled, the discharge capacity determination means 424 judges that the variable capacity compressor 100 is operating with the maximum discharge capacity. On the other hand, if Pss<PsV is fulfilled, the discharge capacity determination means 424 judges that the variable capacity compressor 100 is operating with a controlled discharge capacity.

The criterion value PsV may be varied in accordance with the vehicle speed Vs or the compressor rotation speed Nc. In a low speed region, for example, the criterion value PsV may be set to a larger value so as to be closer to the upper-limit threshold PssH. Also, the criterion value PsV may be varied in accordance with the outside air temperature Ta. When the outside air temperature Ta is high, for example, the criterion value PsV may be set to a larger value. Further, the criterion value PsV may be varied in accordance with one of the vehicle speed Vs and the compressor rotation speed Nc, and the outside air temperature Ta.

If it is judged by the discharge capacity determination means 424 that the variable capacity compressor 100 is operating with the maximum discharge capacity, the drive load calculation means 425 calculates a torque as the drive load of the variable capacity compressor 100, according to first drive load computing equation Tr1. On the other hand, if it is judged by the discharge capacity determination means 424 that the variable capacity compressor 100 is operating with a controlled discharge capacity, the drive load calculation means 425 calculates a torque as the drive load of the variable capacity compressor 100, according to second drive load computing equation Tr2.

Figure 8:
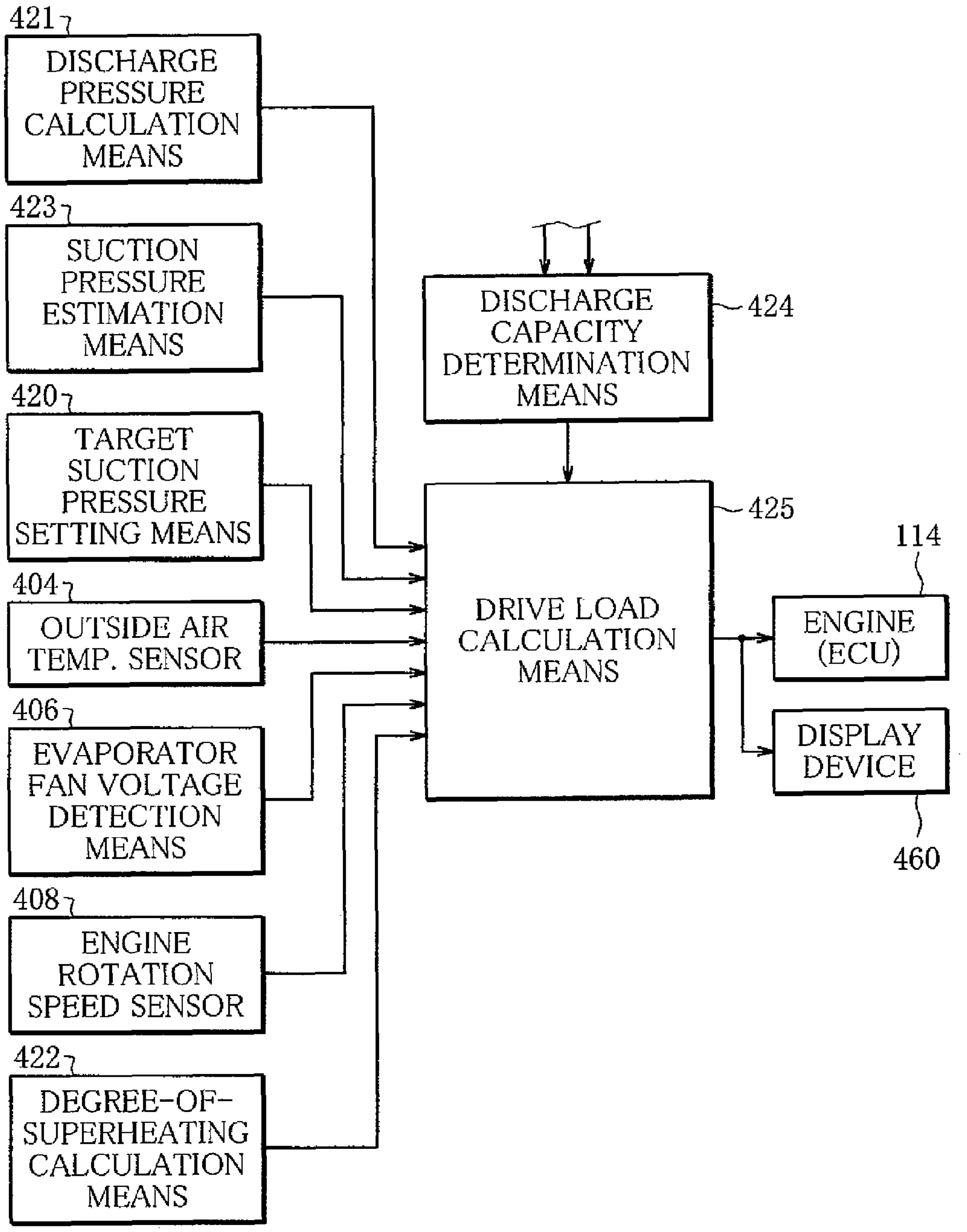
FIG. 8 is a block diagram illustrating external information used for calculating a drive load in the capacity control system of the embodiment.

The drive load calculation means 425 calculates the drive load by using the external information indicated in FIG. 8, namely, the target suction pressure Pss set by the target suction pressure setting means 420, the pressure Pd calculated by the discharge pressure calculation means 421, the degree of superheating SH calculated by the degree-of-superheating calculation means 422, the pressure Ps of the suction pressure region estimated by the suction pressure estimation means 423, the outside air temperature Ta detected by the outside air temperature sensor 404, the voltage Vf detected by the evaporator fan voltage detection means 406, and the compressor rotation speed Nc detected by the engine rotation speed sensor 408.

The first drive load computing equation Tr1 includes, as variables, the pressure Pd of the discharge pressure region calculated by the discharge pressure calculation means 421 and the pressure Ps of the suction pressure region estimated by the suction pressure estimation means 423, as indicated by expression (4) below. In expression (4), n is the polytropic index (in the case of the R134a refrigerant, 1.03), η is the volumetric efficiency, Vc is the maximum discharge capacity of the variable capacity compressor 100, and Tloss is the mechanical loss.

$$Tr1 = \frac{n}{n-1} \cdot \eta \cdot Vc \cdot Ps \cdot \left\{ \left( \frac{Pd}{Ps} \right)^{\frac{n-1}{n}} - 1 \right\} + Tloss \tag{4}$$

The second drive load computing equation Tr2 includes, as variables, the pressure Pd of the discharge pressure region calculated by the discharge pressure calculation means 421, the target suction pressure Pss set by the target suction pressure setting means 420 and the pressure difference between the pressure Pd of the discharge pressure region and the target suction pressure Pss, as indicated by expression (5) below.

$$Tr2 = \frac{n}{n-1} \cdot \frac{\{k1 \cdot (Pd - Pss)^2 + k2 \cdot (Pd - Pss) + k3\} \cdot Pss}{Nc} \cdot \left\{ \left( \frac{Pd}{Pss} \right)^{\frac{n-1}{n}} - 1 \right\} + Tloss \tag{5}$$

In expression (5), the second-order polynomial enclosed in braces and including, as a variable, the pressure difference between the pressure Pd of the discharge pressure region and the target suction pressure Pss corresponds to the weight of the circulated refrigerant, and k1, k2 and k3 are coefficients.

The torque calculated as the drive load of the variable capacity compressor 100 according to expression (4) or (5) is output to the engine 114, that is, the engine ECU, and is used so as to optimize the engine control.

Also, the torque calculated as the drive load of the variable capacity compressor 100 according to expression (4) or (5) is output to a display device 460 which is arranged in an air conditioning control panel, or the instrument panel equipped with a speedometer and the like, or a navigation system, all located inside the vehicle compartment.

When a drive load signal calculated according to the second drive load computing equation Tr2 is input, that is, when it is judged by the discharge capacity determination means 424 that the variable capacity compressor 100 is operating with a controlled discharge capacity, the display device 460 displays an energy saving mark including the letters "ECO", for example. The display device 460 serves to make the user recognize visually, for example, that the capacity control valve 200 and the variable capacity compressor 100 are operating in energy saving mode.

The discharge capacity determination means 424 may alternatively determine the operating state of the variable capacity compressor 100 on the basis of a signal input from a flow rate sensor for detecting the flow rate of the refrigerant flowing through the circulation path 12, or a signal input from a differential pressure sensor for detecting the pressure difference between two pressure monitoring points, or a discharge capacity control signal supplied to the capacity control valve which is equipped with mechanical differential pressure detection means for detecting the pressure difference between two pressure monitoring points.

FIGS. 9 through 14 illustrate a capacity control system for a variable capacity compressor according to another embodiment of the present invention. Also in this embodiment, the capacity control system A of the invention is applied to a refrigeration cycle of an automotive air conditioning system.

Figure 9:
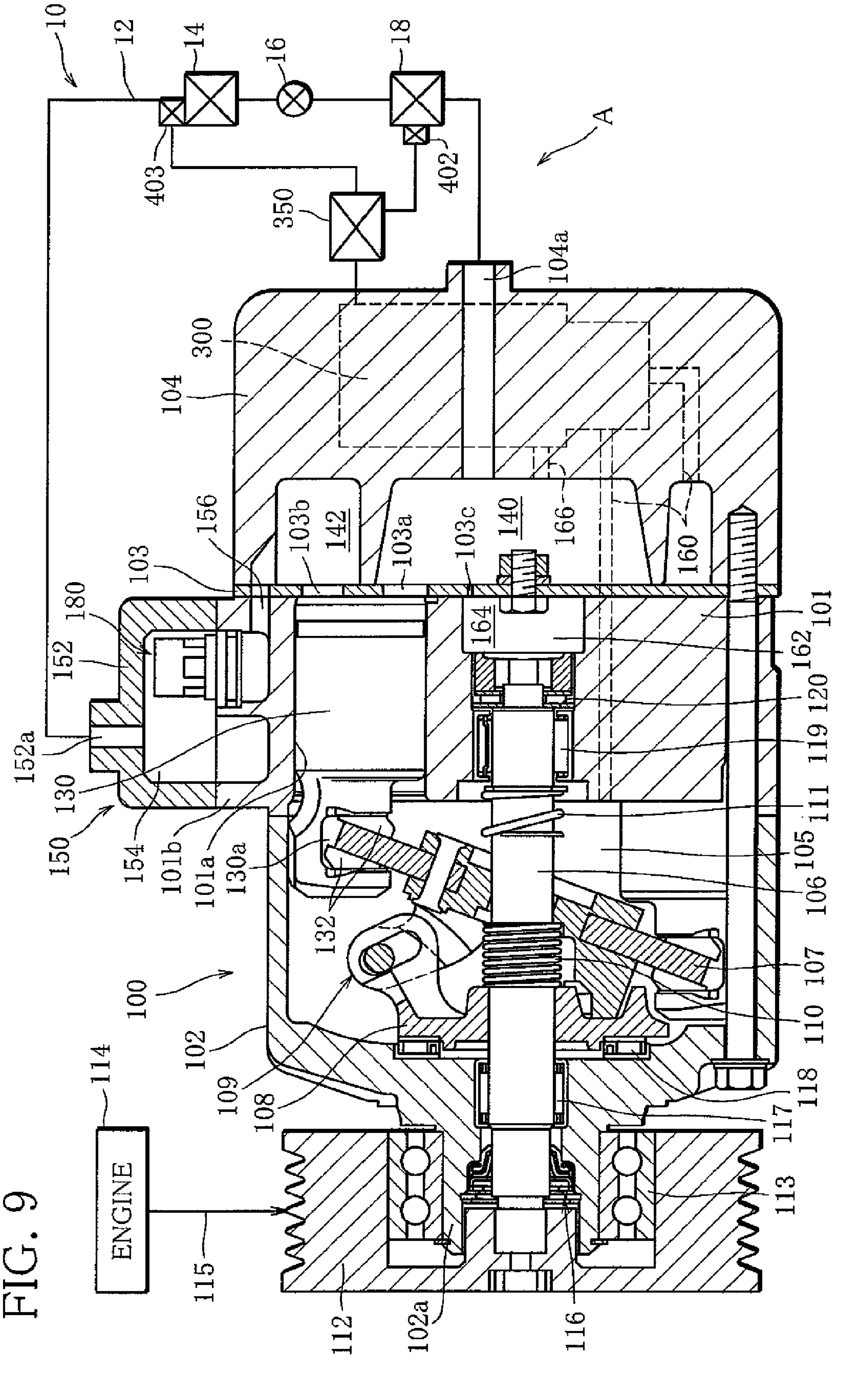
FIG. 9 is a longitudinal sectional view of a variable capacity compressor and also illustrates a schematic construction of a refrigeration cycle of an automotive air conditioning system to which another embodiment of the present invention is applied.

FIG. 9 shows a swash plate-type variable capacity compressor 100 used in the capacity control system A of the second embodiment. The variable capacity compressor 100, which is of a clutchless type, is equipped with a capacity control valve 300 having a construction different from that of the capacity control valve 200 in the variable capacity compressor 100 used in the first embodiment. The body of the compressor 100 is identical in construction with that of the variable capacity compressor 100 used in the first embodiment, and therefore, description of the body of the compressor 100 is omitted.

Figure 10:
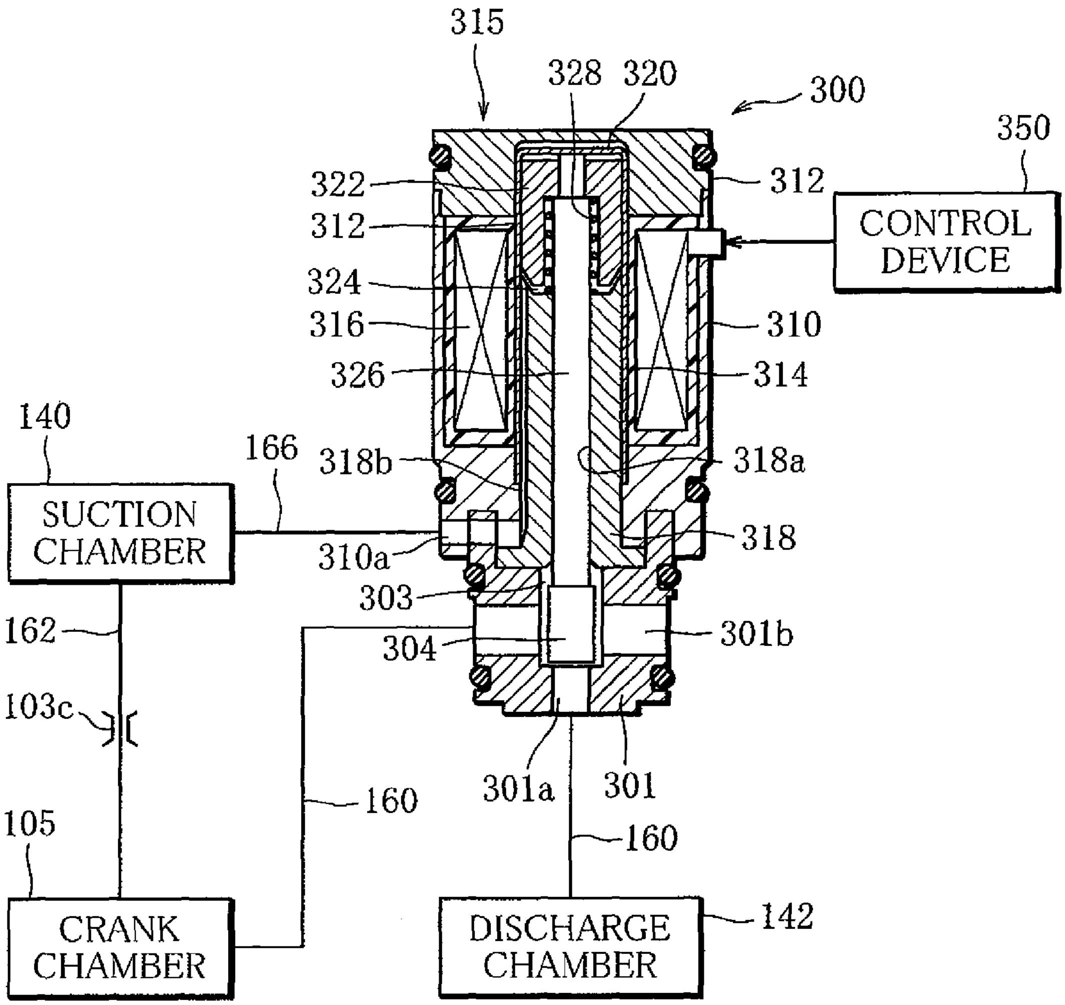
FIG. 10 is a sectional view illustrating connections of a capacity control valve in the variable capacity compressor shown in FIG. 9.

As illustrated in FIG. 10, the capacity control valve 300 comprises a valve unit and a drive unit for opening and closing the valve unit. The valve unit includes a cylindrical valve housing 301, and a valve hole 301*a* serving as an inlet port is formed at one end of the valve housing 301. The valve hole 301*a* communicates with the discharge chamber 142 through the upstream section of the admission passage 160 and opens into a valve chamber 303 formed inside the valve housing 301.

A columnar valve element 304 is accommodated in the valve chamber 303. The valve element 304 is movable within the valve chamber 303 in the axial direction of the valve housing 301 and, when brought into contact with an inner end face of the valve housing 301, closes the valve hole 301*a*. Namely, the inner end face of the valve housing 301 serves as a valve seat.

Outlet ports 301*b* open in the outer peripheral surface of the valve housing 301 and communicate with the crank chamber 105 through the downstream section of the admission passage 160. The outlet ports 301*b* also open into the valve chamber 303, and thus the discharge chamber 142 and the crank chamber 105 can communicate with each other through the valve hole 301*a*, the valve chamber 303 and the outlet ports 301*b*.

The drive unit, on the other hand, comprises a solenoid unit 315 coupled to the other end of the valve housing 301. The solenoid unit 315 includes a cylindrical solenoid housing 310 attached to the valve housing 301 coaxially therewith, and an end cap 312 closing an open end of the solenoid housing 310 located opposite the valve housing 301.

A cylindrical sleeve 320 opening at one end close to the valve housing 301 and closed at the other end is fitted in the solenoid housing 310 coaxially therewith. A fixed core 318 is received in a portion of the sleeve 320 extending from the open end to an intermediate portion of same. A core accommodation space 324 is defined between the closed end of the sleeve 320 close to the end cap 312 and the fixed core 318, and a movable core 322 is axially movably accommodated in the core accommodation space 324.

A solenoid rod 326 is slidably inserted through an insertion hole 318*a* formed coaxially with the fixed core 318. One end of the solenoid rod 326 projecting into the valve chamber 303 is coupled to the valve element 304 integrally therewith, and the other end of the solenoid rod 326 projecting into the core accommodation space 324 is securely fitted into a through hole formed through the movable core 322. Thus, the movable core 322 and the solenoid rod 326 move together with each other like a one-piece member.

A release spring 328 is disposed between a center shoulder of the movable core 322 and the end face of the fixed core 318, and a predetermined gap is provided between the fixed core 318 and the movable core 322.

The sleeve 320 arranged in the solenoid housing 310 is surrounded by a coil 316 covered with a covering 314 made of resin. The solenoid housing 310, the end cap 312, the fixed core 318 and the movable core 322 are each made of magnetic material and constitute a magnetic circuit. On the other hand, the sleeve 320 is made of nonmagnetic stainless steel or the like.

The solenoid housing 310 has a pressure sensing port 310*a* formed therein, and the pressure sensing port 310*a* communicates with the suction chamber 140 through the pressure sensing passage 166. An axially extending pressure sensing groove 318*b* is formed in the outer peripheral surface of the fixed core 318 and communicates with the pressure sensing port 310*a*.

Since the suction chamber 140 and the movable core accommodation space 324 communicate with each other through the pressure sensing port 310*a* and the pressure sensing groove 318*b*, the pressure in the suction chamber 140 (hereinafter referred to as suction pressure Ps) acts upon the back side of the valve element 304 through the solenoid rod 326 in the valve closing direction.

The solenoid unit 315 is connected to a control device 350 provided externally to the variable capacity compressor 100 and, when supplied with a control current I from the control device 350, produces an electromagnetic force F(I). The electromagnetic force F(I) exerted by the solenoid unit 315 attracts the movable core 322 toward the fixed core 318, so that the valve element 304 is urged in the valve closing direction.

In the capacity control valve 300 constructed as described above, the pressure in the discharge chamber 142 (hereinafter referred to as the discharge pressure Pd) acts upon the one end face of the valve element 304, and the pressure in the suction chamber 140 (hereinafter referred to as the suction pressure Ps) acts upon the end face of the solenoid rod 326 located opposite the valve element 304. Consequently, the valve element 304 functions as a pressure sensitive member.

The capacity control valve 300 may be constructed so that a pressure receiving area (hereinafter referred to as seal area Sv) of the valve element 304 on which the refrigerant pressure acts when the valve hole 301*a* is closed by the valve element 304 may be equal to the cross-sectional area of the solenoid rod 326 supported in the insertion hole 318*a* of the fixed core 318. In this case, the pressure in the crank chamber 105 (hereinafter referred to as crank pressure) does not substantially act upon the valve element 304 in the valve opening direction or in the valve closing direction.

Consequently, provided that the force always applied by the spring 328 to the valve element 304 in the valve opening direction is fs, the forces acting upon the valve element 304 can be expressed by expression (6) below, and modifying expression (6) provides expression (7).

$$Sv\cdot(Pd-Ps)+fs-F(I)=0 \tag{6}$$

$$Ps=-(1/Sv)\cdot F(I)+Pd+(fs/Sv) \tag{7}$$

From expression (7), it is clear that the suction pressure Ps is found if the discharge pressure Pd and the electromagnetic force F(I), that is, the control current I, are determined.

Namely, by setting in advance the target suction pressure Pss as a control target and also obtaining information about the varying discharge pressure Pd, it is possible to calculate the electromagnetic force F(I), that is, the control current I. The amount of current supplied to the solenoid unit 315 is adjusted on the basis of the calculated value, whereby the valve element 304 is moved to control the crank pressure Pc such that the suction pressure is maintained at the target suction pressure Pss. Namely, the discharge capacity can be controlled.

Figure 11:
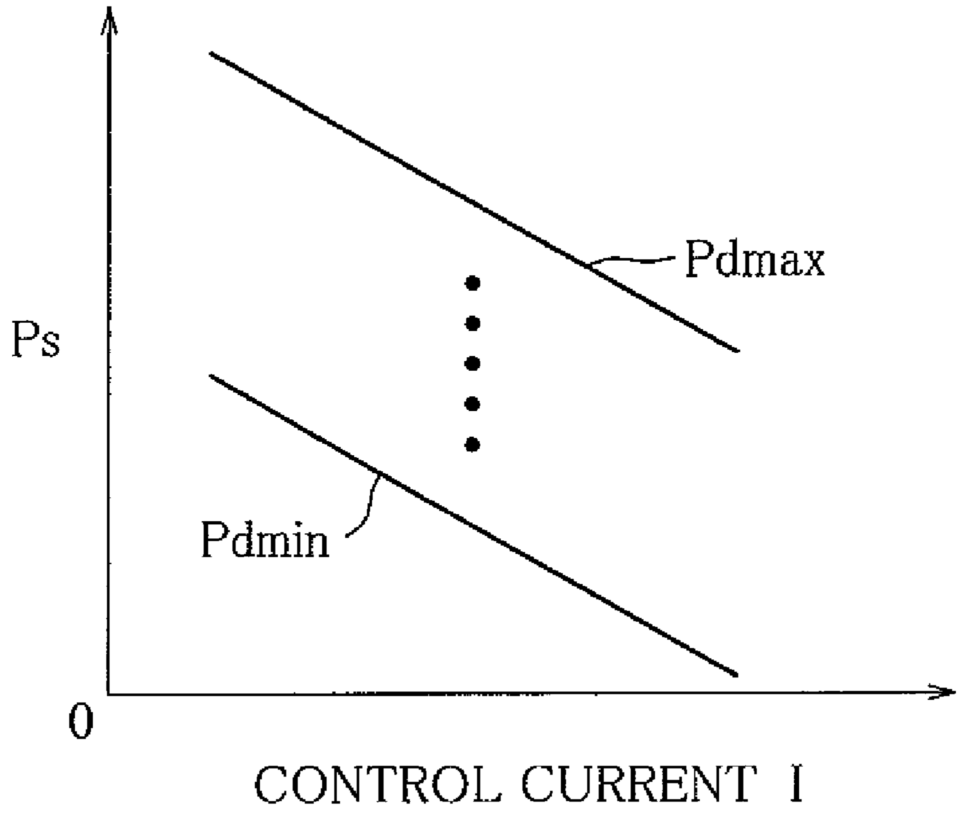
FIG. 11 is a graph illustrating the relationship between a control current supplied to the capacity control valve in FIG. 9 and a target suction pressure.

In the case of the control wherein the suction pressure Ps is kept at the target suction pressure Pss, the suction pressure Ps can be controlled within a range between Pdmin and Pdmax, indicated in FIG. 11, depending on the magnitude of the discharge pressure Pd, as seen from expression (7). Namely, the suction pressure control range is slidable to a higher pressure side, thus making it possible to control the discharge capacity even in a high heat load region.

Also, expression (7) reveals that, by setting the seal area Sv to a smaller value, it is possible to widen or expand the control range of the suction pressure Ps for any discharge pressure Pd even if the electromagnetic force F(I) is small. Where the slidability and expandability of the control range of the suction pressure Ps are combined, the control range of the suction pressure Ps can be expanded greatly by the synergy effect.

When the amount of current supplied to the solenoid unit 315 is set to zero, the valve element 304 is moved in the valve opening direction by the force of the spring 328 constantly applied to the valve element 304, so that the valve hole 301 is opened. Accordingly, the discharged gas is introduced into the crank chamber 105, maintaining the discharge capacity at the minimum.

Figure 12:
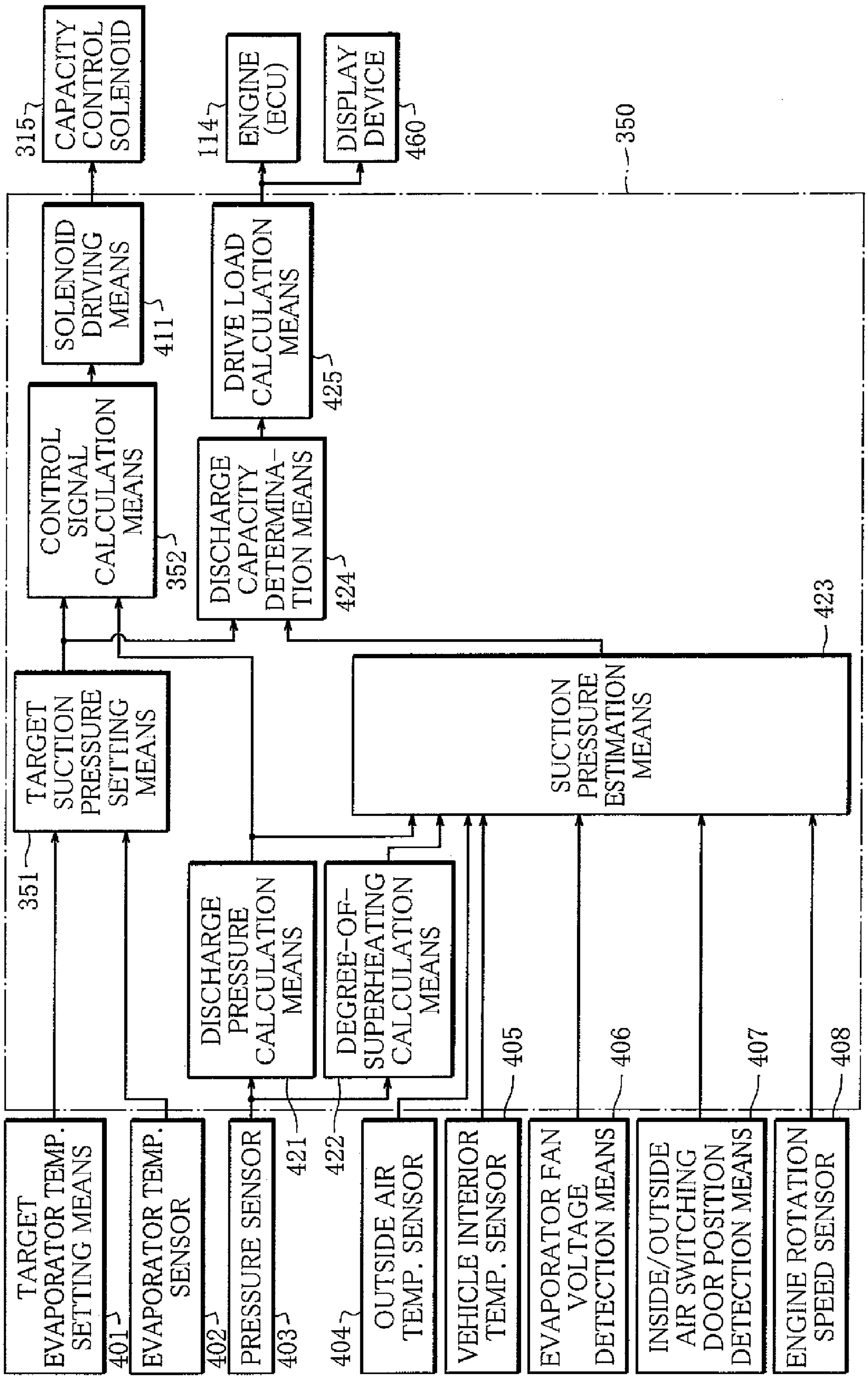
FIG. 12 is a block diagram illustrating a schematic configuration of a capacity control system according to the second embodiment.

FIG. 12 is a block diagram illustrating a schematic configuration of the capacity control system A including the control device 350. The capacity control system A including the control device 350 is similar in configuration to the capacity control system A of the first embodiment, and therefore, in the following, only the differences between the capacity control systems A of the first and second embodiments will be described.

The capacity control system A including the control device 350 has target suction pressure setting means 351. The target suction pressure setting means 351 sets the target suction pressure Pss, as a control target, on the basis of a deviation between the target evaporator outlet air temperature Tes set by the target evaporator temperature setting means 401 and the evaporator outlet air temperature Te actually detected by the evaporator temperature sensor 402.

Also, the capacity control system A including the control device 350 has control signal calculation means 352. Based on the target suction pressure Pss and the discharge pressure Pd calculated by the discharge pressure calculation means 421, the control signal calculation means 352 calculates the amount of current to be supplied to the solenoid 315, according to a predetermined computing equation.

The following describes the operation (manner of use) of the aforementioned capacity control system A.

Figure 13:
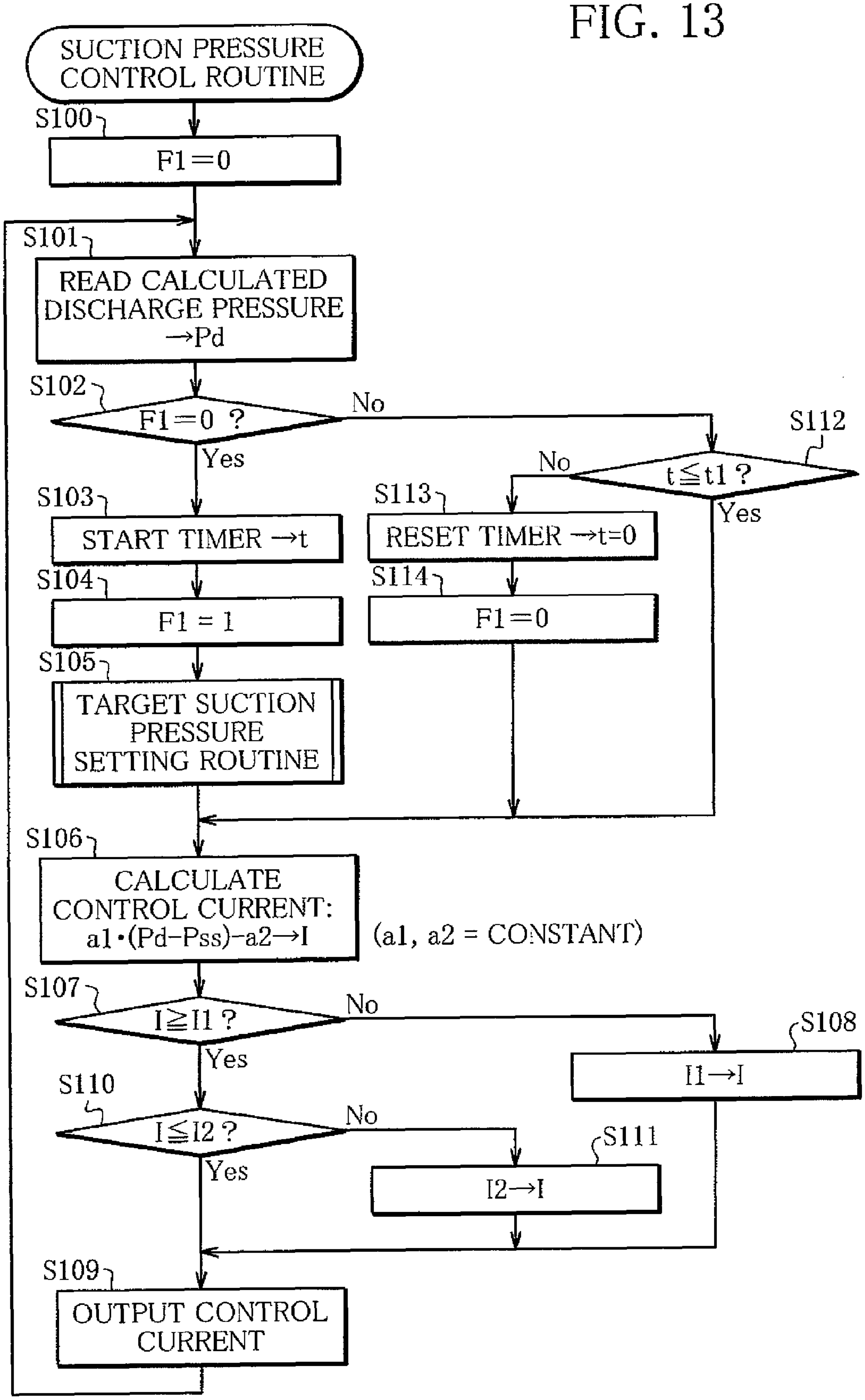
FIG. 13 is a flowchart illustrating a suction pressure control routine executed by the capacity control system illustrated in FIG. 12.

FIG. 13 is a flowchart illustrating the suction pressure control executed by the control device 350, namely, a program executed by the control device 350.

The program is started when the engine key of the vehicle is turned on, for example. Upon start of the program, an initial condition is set first (S100).

Subsequently, the discharge pressure Pd calculated by the discharge pressure calculation means 421 is read in (S101), and it is determined whether or not a flag F1 is "0" (S102). Since F1=0 has been set as the initial condition, the result of the decision in S102 is Yes. Accordingly, a timer is started (S103), and the flag F1 is set to "1" (S104).

Then, in a target suction pressure setting routine S105, the target suction pressure Pss is set as a control target. Subsequently, the amount of current to be supplied to the solenoid unit 315, that is, the control current I, is calculated on the basis of the target suction pressure Pss and the discharge pressure Pd calculated by the discharge pressure calculation means 421 (S106). The control current I is calculated according to expression (6), with the target suction pressure Pss substituted for Ps in expression (6).

It is then determined whether or not the calculated control current I assumes a value greater than or equal to a preset lower-limit value I1 (S107). If the result of the decision is No, the lower-limit value I1 is read as the control current I (S108), and the control current I is output to the solenoid unit 315 (S109).

On the other hand, if the result of the decision in S107 is Yes, it is determined whether or not the calculated control current I assumes a value smaller than or equal to a preset upper-limit value I2 (S110). The upper-limit value I2 is greater than the lower-limit value I1. If the result of the decision is No, the upper-limit value I2 is read as the control current I (S111), and the control current I is output to the solenoid unit 315 (S109).

Accordingly, if it is found as a result of the decisions in S107 and S110 that the relationship $I1 \leqq I \leqq I2$ is fulfilled, the control current I calculated in S106 is directly output.

When the suction pressure control routine is executed the second time, the result of the decision in S102 becomes No because F1=1 has been set before, and it is determined whether or not the time measured by the timer assumes a value smaller than or equal to a predetermined time t1 (S112). If the result of the decision is Yes, that is, if the time measured by the timer has not yet reached the predetermined time t1, the control current I to be supplied to the solenoid unit 315 is calculated on the basis of the previously set target suction pressure Pss and the discharge pressure Pd calculated in the present cycle (S106). After S106 is executed, S107 to S111 are executed in the same manner as in the previous cycle.

If, on the other hand, the result of the decision in S112 is No, that is, if the time measured by the timer has reached the predetermined time t1, the timer is reset (S113) and the flag F1 is set to "0" (S114).

Thus, in the suction pressure control executed by the control device 350, the discharge pressure Pd is read at all times so as to maintain the target suction pressure Pss, and the control current I to be supplied to the solenoid unit 315 is adjusted in accordance with the varying discharge pressure Pd. The target suction pressure Pss is updated at intervals of the predetermined time t1.

Figure 14:
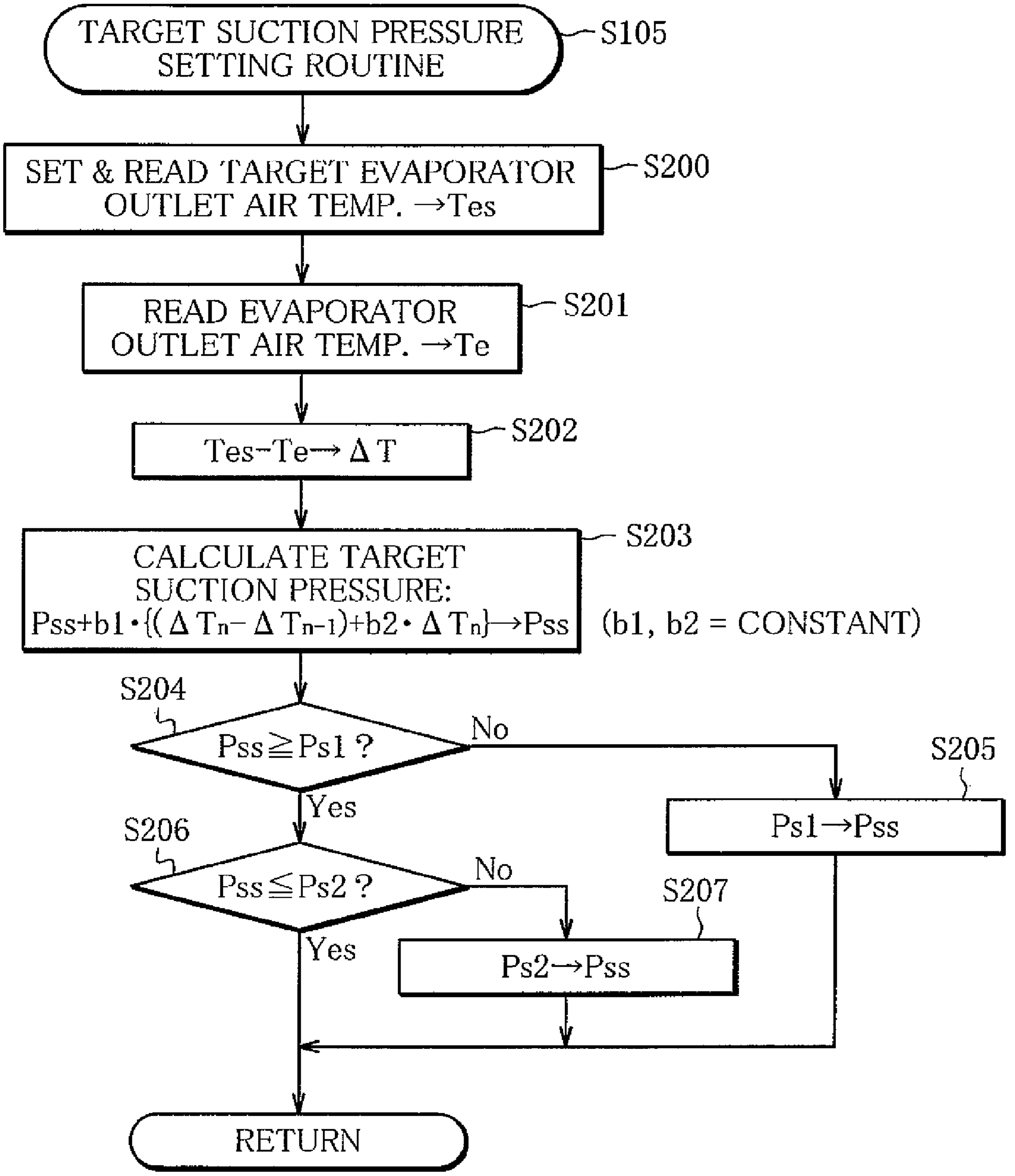
FIG. 14 is a flowchart illustrating a target suction pressure setting routine included in the suction pressure control routine of FIG. 12.

Referring now to FIG. 14, the target suction pressure setting routine S105 will be explained.

First, the target evaporator temperature setting means 401 sets the evaporator outlet air temperature Tes as a target of the discharge capacity control for the variable capacity compressor 100, and the thus-set target evaporator outlet air temperature Tes is read in (S200).

Subsequently, the evaporator outlet air temperature Te detected by the temperature sensor 402 is read (S201), and a deviation ΔT between the target evaporator outlet air temperature Tes and the actual evaporator outlet air temperature Te is calculated (S202).

Then, based on the calculated deviation ΔT, the target suction pressure Pss is calculated according to a predetermined computing equation, for example, a computing equation for PI control (S203).

It is then determined whether or not the calculated target suction pressure Pss assumes a value greater than or equal to a preset lower-limit value Ps1 (S204). If the result of the decision is No, the lower-limit value Ps1 is read as the target suction pressure Pss (S205). On the other hand, if the result of the decision in S204 is Yes, it is determined whether or not the calculated target suction pressure Pss assumes a value smaller than or equal to a preset upper-limit value Ps2 (S206). The upper-limit value Ps2 is greater than the lower-limit value Ps1. If the result of the decision is No, the upper-limit value Ps2 is read as the target suction pressure Pss (S207). If it is found as a result of the decisions in S204 and S206 that the relationship $Ps1 \leqq Pss \leqq Ps2$ is fulfilled, the value calculated in S203 is directly read as the target suction pressure Pss.

Thus, in the capacity control system including the control device 350 according to the second embodiment, the target suction pressure Pss is set on the basis of the deviation ΔT, and the discharge capacity is controlled so that the evaporator outlet air temperature Te may approach the target evaporator outlet air temperature Tes. The target evaporator outlet air temperature Tes is varied appropriately in accordance with the air conditioned state of the vehicle compartment.

The heat load estimation accuracy improves if the following parameters are found, the parameters including the outside air humidity, the pressure in the high pressure region of the refrigeration cycle 10 or the temperature corresponding to the pressure, the pressure in the low pressure region of the refrigeration cycle 10 or the temperature corresponding to the pressure, the solar radiation amount, various settings of the air conditioning system (settings related to the amount of air blown by the evaporator fan, the position of the inside/outside air switching door, the vehicle interior temperature, the air outlet position, and the position of the air mix door), the vehicle interior humidity, the evaporator inlet air temperature and humidity, the surface temperatures of various parts in the vehicle compartment, and the like. Accordingly, it is desirable that an outside air humidity sensor, a vehicle interior humidity sensor, etc. be used as the heat load detection means.

In the foregoing embodiments, the suction pressure Ps estimated by the suction pressure estimation means 423 is compared with the upper- and lower-limit thresholds PssH and PssL set with reference to the target suction pressure Pss, to determine whether the variable capacity compressor 100 is operating with the maximum discharge capacity or with the controlled discharge capacity. Alternatively, the operating state of the variable capacity compressor 100 may be determined by comparing the estimated suction pressure Ps with the target suction pressure Pss. Also, instead of setting the two, upper- and lower-limit thresholds PssH and PssL with reference to the target suction pressure Pss, only one threshold may be set, and the operating state may be determined on the basis of the estimated suction pressure Ps and the set threshold. Namely, the operating state of the variable capacity compressor may be determined on the basis of the suction pressure Ps estimated by the suction pressure estimation means 423 and the target suction pressure Pss.

In the above embodiments, a clutchless compressor is used as the variable capacity compressor 100, but a variable displacement compressor equipped with an electromagnetic clutch may alternatively be used.

Also, in the above embodiments, a swash plate-type reciprocating compressor is used as the variable capacity compressor 100. Alternatively, the variable capacity compressor to be used may be a wobble plate-type compressor or a hermetic-type variable capacity compressor having an electric motor built therein.

Further, in the variable capacity compressors 100 used in the foregoing embodiments, the fixed orifice 103*c* formed in the valve plate 103 is used as a constriction element of the bleeding passage 162 for regulating the flow rate of the refrigerant to thereby increase the pressure in the crank chamber 105. The constriction element is, however, not limited to the fixed orifice alone. As such constriction element, a constriction or valve with a variable opening, for example, may be used to regulate the flow rate of the refrigerant.

Moreover, in the above capacity control systems A, the capacity control valve 200, 300 is inserted in the admission passage 160 connecting the discharge chamber 142 to the crank chamber 105. Where the variable capacity compressor 100 is a swash plate-type or wobble plate-type compressor, the capacity control valve 200, 300 may be arranged in the bleeding passage 162 connecting the crank chamber 105 to the suction chamber 140, instead of the admission passage 160. Namely, the capacity control valve 200 (300) is applicable not only to inlet control for controlling the opening of the admission passage 160, but to outlet control for controlling the opening of the bleeding passage 162.

Furthermore, the capacity control systems A can be applied to a scroll-type or vane-type variable capacity compressor. Namely, the capacity control systems A are applicable to any variable capacity compressor using a capacity control valve of which the valve element is acted upon by the discharge pressure, the suction pressure and the electromagnetic force of a solenoid and which is capable of varying, through adjustment of its valve opening, the control pressure (in the case of a reciprocating compressor, the pressure in the crank chamber) for changing the discharge capacity of the compressor.

The capacity control systems A for a variable capacity compressor according to the present invention are applicable not only to the refrigeration cycle of an automotive air conditioning system, but to refrigeration cycles in general, such as the refrigeration cycle of a room air conditioning system. Also, the capacity control systems A can be applied not only to refrigeration cycles using R134a or carbon dioxide as the refrigerant, but to refrigeration cycles using, as the refrigerant, other new refrigerant than R134a and carbon dioxide.

The invention claimed is:

1. A capacity control system for a variable capacity compressor whose capacity varies with change in control pressure, the variable capacity compressor being inserted, together with a heat radiator, an expansion device and an evaporator, in a circulation path for circulating a refrigerant, to constitute a refrigeration cycle of an air conditioning system, a pressure of the refrigerant at any portion in a discharge pressure region of the refrigeration cycle being used as a discharge pressure, and a pressure of the refrigerant at any portion in a suction pressure region of the refrigeration cycle being used as a suction pressure, the capacity control system comprising:

a capacity control valve capable of adjusting the capacity of the variable capacity compressor by varying the control pressure;

external information detection means for detecting one or more items of external information related to the refrigeration cycle; and target suction pressure setting means for setting, based on the external information detected by the external information detection means, a target suction pressure for controlling the pressure in the suction pressure region as a control target;

wherein the control pressure is varied to adjust the refrigerant discharge capacity of the variable capacity compressor such that the pressure in the suction pressure region becomes equal to the target suction pressure;

suction pressure estimation means for estimating, based on the external information detected by the external information detection means, a pressure that is estimated to prevail in the suction pressure region if the variable capacity compressor is operated with a maximum discharge capacity; and discharge capacity determination means for determining, based on the estimated pressure of the suction pressure region estimated by the suction pressure estimation means and the target suction pressure set by the target suction pressure setting means, whether the variable capacity compressor is operating with the maximum discharge capacity or with a controlled discharge capacity.

2. The capacity control system according to claim 1, wherein:

the discharge capacity determination means compares the estimated pressure of the suction pressure region estimated by the suction pressure estimation means with the target suction pressure set by the target suction pressure setting means, if the estimated pressure of the suction pressure region estimated by the suction pressure estimation means is higher than the target suction pressure set by the target suction pressure setting means, the discharge capacity determination means judges that the variable capacity compressor is operating with the maximum discharge capacity, and if the estimated pressure of the suction pressure region estimated by the suction pressure estimation means is lower than the target suction pressure set by the target suction pressure setting means, the discharge capacity determination means judges that the variable capacity compressor is operating with the controlled discharge capacity.

3. The capacity control system according to claim 1, wherein:

the target suction pressure setting means sets a threshold with reference to the target suction pressure, the discharge capacity determination means compares the estimated pressure of the suction pressure region estimated by the suction pressure estimation means with the threshold set by the target suction pressure setting means, if the estimated pressure of the suction pressure region is higher than the threshold, the discharge capacity determination means judges that the variable capacity compressor is operating with the maximum discharge capacity, and if the estimated pressure of the suction pressure region is lower than the threshold, the discharge capacity determination means judges that the variable capacity compressor is operating with the controlled discharge capacity.

4. The capacity control system according to claim 3, wherein a pressure difference between the threshold or the upper- or lower-limit threshold set by the target suction pressure setting means and the target suction pressure with reference to which the threshold or the upper- or lower-limit threshold is set is variable in accordance with the target suction pressure.

5. The capacity control system according to claim 1, wherein:

the target suction pressure setting means sets upper- and lower-limit thresholds with reference to the target suction pressure, the discharge capacity determination means compares the estimated pressure of the suction pressure region estimated by the suction pressure estimation means with the upper- and lower-limit thresholds set by the target suction pressure setting means, if the estimated pressure of the suction pressure region is higher than the upper-limit threshold, the discharge capacity determination means judges that the variable capacity compressor is operating with the maximum discharge capacity, and if the estimated pressure of the suction pressure region is lower than the lower-limit threshold, the discharge capacity determination means judges that the variable capacity compressor is operating with the controlled discharge capacity.

6. The capacity control system according to claim 5, wherein, when the estimated pressure of the suction pressure region assumes a value between the upper- and lower-limit thresholds, the discharge capacity determination means judges that the variable capacity compressor is operating with the maximum discharge capacity if the estimated pressure of the suction pressure region is greater than or equal to a criterion value set between the upper- and lower-limit thresholds, and judges that the variable capacity compressor is operating with the controlled discharge capacity if the estimated pressure of the suction pressure region is smaller than the criterion value.

7. The capacity control system according to claim 6, wherein the criterion value is variable in accordance with the external information detected by vehicle speed detection means as the external information detection means for detecting a vehicle speed, and/or the external information detected by rotational speed detection means as the external information detection means for detecting a physical quantity corresponding to a rotational speed of the variable capacity compressor.

8. The capacity control system according to claim 6, wherein the criterion value is variable in accordance with the external information detected by heat load detection means as the external information detection means.

9. The capacity control system according to claim 1, wherein the suction pressure estimation means estimates the pressure in the suction pressure region, based on the external information obtained by discharge pressure calculation means as the external information detection means for calculating the pressure of the discharge pressure region of the variable capacity compressor, the external information detected by heat load detection means as the external information detection means, and the external information detected by rotational speed detection means as the external information detection means for detecting a physical quantity corresponding to a rotational speed of the variable capacity compressor.

10. The capacity control system according to claim 9, wherein the discharge pressure calculation means calculates the pressure of the discharge pressure region, based on the external information detected by pressure detection means for detecting a pressure in a high pressure region ranging from the discharge pressure region of the variable capacity compressor to the expansion device of the refrigeration cycle.

11. The capacity control system according to claim 10, wherein:

the expansion device comprises a thermostatic automatic expansion valve, the capacity control system further comprises degree-of-superheating calculation means for calculating, based on the external information detected by the pressure detection means, a degree of superheating in an outlet region of the evaporator, and the suction pressure estimation means estimates the pressure of the suction pressure region, based on the external information calculated by the degree-of-superheating calculation means.

12. The capacity control system according to claim 9, wherein:

the external information detection means includes degree-of-superheating detection means for detecting a degree of superheating in a region ranging from an outlet region of the evaporator to the suction pressure region of the variable capacity compressor, and the suction pressure estimation means estimates the pressure of the suction pressure region, based on the external information detected by the degree-of-superheating detection means.

13. The capacity control system according to claim 1, further comprising drive load calculation means for calculating a drive load of the variable capacity compressor, wherein the drive load calculation means calculates the drive load of the variable capacity compressor according to a first drive load computing equation if it is judged by the discharge capacity determination means that the variable capacity compressor is operating with the maximum discharge capacity, and calculates the drive load of the variable capacity compressor according to a second drive load computing equation if it is judged by the discharge capacity determination means that the variable capacity compressor is operating with the controlled discharge capacity.

14. The capacity control system according to claim 13, wherein the first drive load computing equation according to which the drive load is calculated by the drive load calculation means includes, as variables, the pressure of the discharge pressure region calculated by the discharge pressure calculation means and the estimated pressure of the suction pressure region estimated by the suction pressure estimation means.

15. The capacity control system according to claim 13, wherein the second drive load computing equation according to which the drive load is calculated by the drive load calculation means includes, as variables, the pressure of the discharge pressure region calculated by the discharge pressure calculation means and the target suction pressure set by the target suction pressure setting means.

16. The capacity control system according to claim 13, wherein the second drive load computing equation according to which the drive load is calculated by the drive load calculation means includes, as a variable, a pressure difference between the pressure of the discharge pressure region calculated by the discharge pressure calculation means and the target suction pressure set by the target suction pressure setting means.

17. The capacity control system according to claim 13, wherein the drive load calculation means outputs the calculated drive load of the variable capacity compressor to an engine control device of the vehicle.

18. The capacity control system according to claim 1, wherein:

the variable capacity compressor includes a housing having a discharge chamber, a crank chamber, a suction chamber and cylinder bores defined therein; pistons received in the respective cylinder bores; a drive shaft rotatably supported in the housing; a conversion mechanism including a tiltable swash plate element for converting rotation of the drive shaft to reciprocating motion of the pistons; an admission passage communicating the discharge chamber with the crank chamber; and a bleeding passage communicating the crank chamber with the suction chamber, and the capacity control valve is inserted in one of the admission passage and the bleeding passage.

19. A display device for use with the capacity control system according to claim 1, wherein the display device displays visual information indicative of energy saving operation mode in a recognizable manner when it is judged by the discharge capacity determination means that the variable capacity compressor is operating with the controlled discharge capacity.

20. A capacity control system for a variable capacity compressor whose capacity varies with change in control pressure, the variable capacity compressor being inserted, together with a heat radiator, an expansion device and an evaporator, in a circulation path for circulating a refrigerant, to constitute a refrigeration cycle of an air conditioning system, the capacity control system comprising:

a capacity control valve having a valve element applied with a discharge pressure, which is a pressure of the refrigerant at any portion in a discharge pressure region of the refrigeration cycle, with a suction pressure, which is a pressure of the refrigerant at any portion in a suction pressure region of the refrigeration cycle, and with an electromagnetic force of a solenoid in such a manner that the discharge pressure is countered by the suction pressure and the electromagnetic force, the valve element being capable of opening and closing a valve hole to vary the control pressure and thereby adjust the capacity of the variable capacity compressor;

external information detection means for detecting one or more items of external information related to the refrigeration cycle; and target suction pressure setting means for setting, based on the external information detected by the external information detection means, a target suction pressure for controlling the pressure in the suction pressure region as a control target;

wherein an opening of the capacity control valve is varied in accordance with the external information detected by the external information detection means, to vary the control pressure and thereby adjust the refrigerant discharge capacity of the variable capacity compressor;

discharge pressure calculation means for calculating, based on the external information detected by the external information detection means, the pressure in the discharge pressure region of the variable capacity compressor;

control signal calculation means for calculating a discharge capacity control signal based on the pressure of the discharge pressure region calculated by the discharge pressure calculation means and the target suction pressure set by the target suction pressure setting means;

solenoid driving means for supplying an electric current to the solenoid of the capacity control valve in accordance with the discharge capacity control signal calculated by the control signal calculation means;

a suction pressure estimation means for estimating, based on the external information detected by the external information means, a pressure that is estimated to prevail in the suction pressure region if the variable capacity compressor is operated with a maximum discharge capacity;

discharge capacity determination means for determining, based on the estimated pressure of the suction pressure region estimated by the suction pressure estimation means and the target suction pressure set by the target suction pressure setting means, whether the variable capacity compressor is operating with the maximum discharge capacity or with a controlled discharge capacity; and drive load calculation means for calculating a drive load of the variable capacity compressor.

21. The capacity control system according to claim 20, wherein the drive load calculation means calculates the drive load of the variable capacity compressor according to a first drive load computing equation if it is judged by the discharge capacity determination means that the variable capacity compressor is operating with a maximum discharge capacity, and calculates the drive load of the variable capacity compressor according to a second drive load computing equation if it is judged by the discharge capacity determination means that the variable capacity compressor is operating with a controlled discharge capacity.

* * * * *